(12) United States Patent
Masuko et al.

(10) Patent No.: US 11,929,648 B2
(45) Date of Patent: Mar. 12, 2024

(54) ELECTRIC MOTOR, COMPRESSOR, AND AIR CONDITIONER

(71) Applicant: Mitsubishi Electric Corporation, Tokyo (JP)

(72) Inventors: Tomoki Masuko, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 589 days.

(21) Appl. No.: 17/255,716

(22) PCT Filed: Jul. 27, 2018

(86) PCT No.: PCT/JP2018/028181
§ 371 (c)(1),
(2) Date: Dec. 23, 2020

(87) PCT Pub. No.: WO2020/021693
PCT Pub. Date: Jan. 30, 2020

(65) Prior Publication Data
US 2021/0273506 A1    Sep. 2, 2021

(51) Int. Cl.
*H02K 1/276* (2022.01)
*F25B 31/02* (2006.01)
*H02K 21/16* (2006.01)

(52) U.S. Cl.
CPC ......... *H02K 1/2766* (2013.01); *F25B 31/026* (2013.01); *H02K 21/16* (2013.01); *H02K 2201/09* (2013.01)

(58) Field of Classification Search
CPC .. H02K 1/2766; H02K 21/16; H02K 2201/09; F25B 31/026
See application file for complete search history.

(56) References Cited

U.S. PATENT DOCUMENTS

| | | | |
|---|---|---|---|
| 2003/0042817 A1* | 3/2003 | Tsuneyoshi | H02K 9/197 310/216.014 |
| 2015/0236558 A1* | 8/2015 | Oketani | H02K 1/276 310/43 |
| 2016/0226321 A1* | 8/2016 | Krishnasamy | B25J 9/126 |
| 2016/0315528 A1* | 10/2016 | Takizawa | H02K 21/16 |

FOREIGN PATENT DOCUMENTS

| | | |
|---|---|---|
| JP | 2007-104782 A | 4/2007 |
| JP | 2009-219291 A | 9/2009 |
| JP | 2015-177643 A | 10/2015 |

* cited by examiner

Primary Examiner — Jianchun Qin
(74) Attorney, Agent, or Firm — POSZ LAW GROUP, PLC

(57) ABSTRACT

An electric motor includes: a stator including a first stator core, a second stator core, and a slot in which a stator winding is disposed, and a rotor including a first rotor core facing a first stator core in a radial direction and a second stator core facing the second stator core in the radial direction. The first stator core and the second stator core are laminated in an axial direction. The stator includes a depression formed in a position facing the slot and not touching the stator winding. A volume of the first rotor core is smaller than a volume of the second rotor core.

15 Claims, 14 Drawing Sheets

ELECTRIC MOTOR, COMPRESSOR, AND AIR CONDITIONER

CROSS REFERENCE TO RELATED APPLICATION

This application is a U.S. national stage application of International Application No. PCT/JP2018/028181 filed on Jul. 27, 2018, the contents of which are incorporated herein by reference.

TECHNICAL FIELD

The present invention relates to an electric motor.

BACKGROUND

An electric motor in which a gap is provided between a stator winding and a stator core has been used in general (see, for example, Patent Reference 1). The gap exists between the stator winding and the stator core, and thus a leak current from the stator winding to the stator core is reduced.

PATENT REFERENCE

Patent Reference 1: Japanese Patent Application Publication No. 2007-104782

If the area of the stator core in a plane orthogonal to the axial direction is small, however, magnetic saturation tends to occur in the stator core, and an iron loss tends to increase in the stator core. Consequently, efficiency of the electric motor (also called motor efficiency) might decrease.

An object of the present invention is to enhance efficiency of an electric motor.

SUMMARY

An electric motor according to the present invention includes: a stator including a first stator core, a second stator core, and a slot in which a stator winding is disposed, the first stator core and the second stator core being laminated in an axial direction; and a rotor including a first rotor core facing the first stator core in a radial direction, a second rotor core facing the second stator core in the radial direction, and a permanent magnet, the rotor being disposed inside the stator, wherein the stator includes a depression formed in a position facing the slot, the depression not touching the stator winding, the first rotor core includes at least one first hole having a first magnet insertion part in which the permanent magnet is inserted and a first flux barrier part communicating with the first magnet insertion part, the second rotor core includes at least one second hole having a second magnet insertion part in which the permanent magnet is inserted and a second flux barrier part communicating with the second magnet insertion part, and a volume of the first rotor core is smaller than a volume of the second rotor core.

An electric motor according to another aspect of the present invention includes: a stator including a first stator core, a second stator core, and a slot in which a stator winding is disposed, the first stator core and the second stator core being laminated in an axial direction; and a rotor including a first rotor core facing the first stator core in a radial direction, a second rotor core facing the second stator core in the radial direction, and a permanent magnet, the rotor being disposed inside the stator, wherein the stator includes a depression formed in a position facing the slot, the depression not touching the stator winding, the first rotor core includes at least one first hole having a first magnet insertion part in which the permanent magnet is inserted and a first flux barrier part communicating with the first magnet insertion part, the second rotor core includes at least one second hole having a second magnet insertion part in which the permanent magnet is inserted and a second flux barrier part communicating with the second magnet insertion part, in a plane orthogonal to the axial direction, the first rotor core includes a projection facing the permanent magnet in a longitudinal direction of the permanent magnet, in the plane, an area of the first flux barrier part is smaller than an area of the second flux barrier part, and a volume of the first rotor core is larger than a volume of the second rotor core.

An electric motor according to another aspect of the present invention includes: a stator including a first stator core, a second stator core, and a slot in which a stator winding is disposed, the first stator core and the second stator core being laminated in an axial direction; and a rotor including a first rotor core facing the first stator core in a radial direction, a second rotor core facing the second stator core in the radial direction, and a permanent magnet, the rotor being disposed inside the stator, wherein the stator includes a depression formed in a position facing the slot, the depression not touching the stator winding, the first rotor core includes at least one first hole having a first magnet insertion part in which the permanent magnet is inserted, the second rotor core includes at least one second hole having a second magnet insertion part in which the permanent magnet is inserted, and a volume of the first rotor core is smaller than a volume of the second rotor core.

According to the present invention, efficiency of the electric motor can be enhanced.

DETAILED DESCRIPTION

First Embodiment

Figure 1:
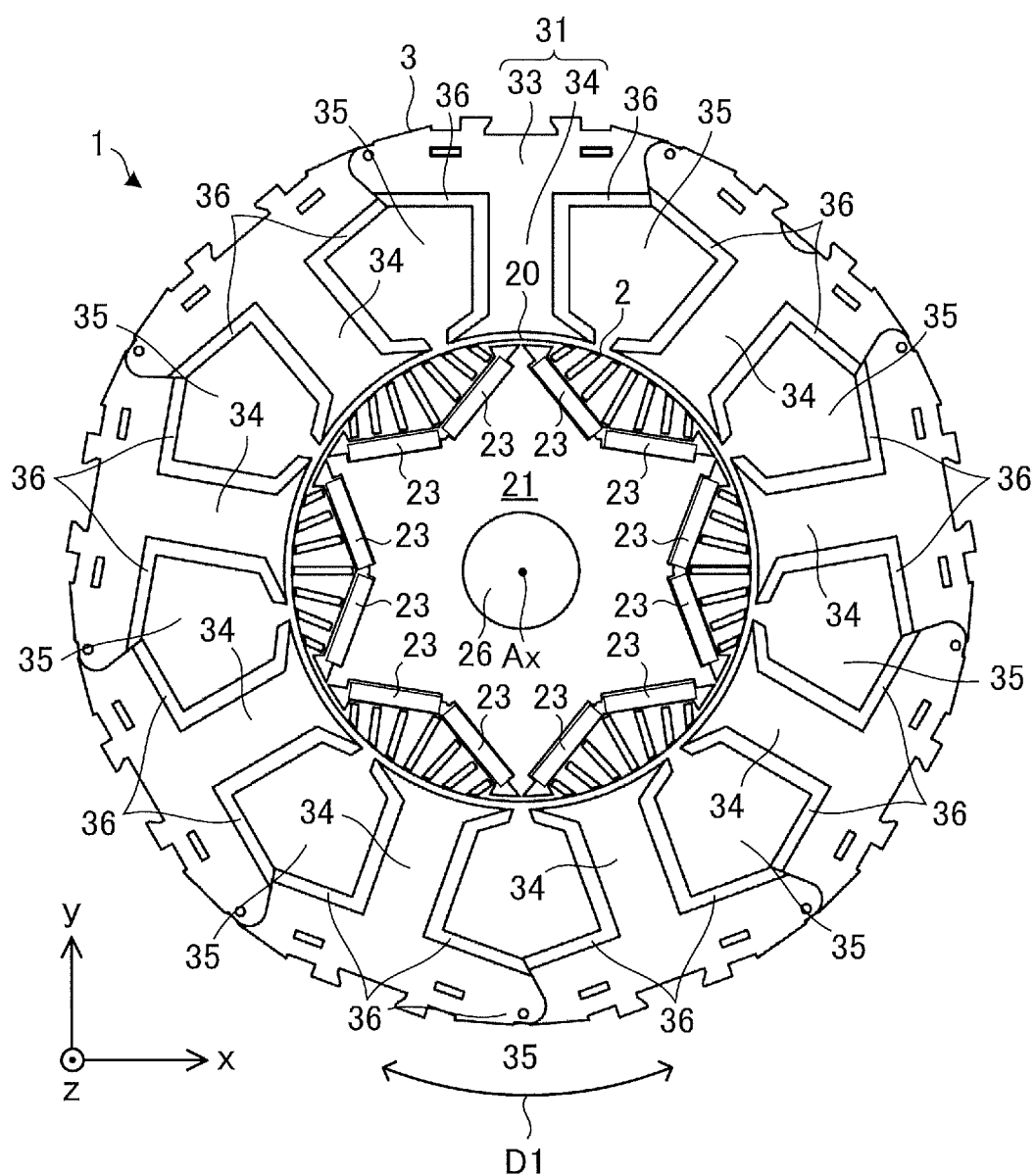
FIG. 1 is a plan view schematically illustrating a structure of an electric motor according to a first embodiment of the present invention.

In xyz orthogonal coordinate systems illustrated in the drawings, a z-axis direction (z axis) represents a direction parallel to an axis line Ax of an electric motor 1, an x-axis direction (x axis) represents a direction orthogonal to the z-axis direction (z axis), and a y-axis direction (y axis) is a direction orthogonal to both the z-axis direction and the x-axis direction. The axis line Ax is a rotation center of a rotor 2. The direction parallel to the axis line Ax is also referred to as an "axial direction of the rotor 2" or simply an "axial direction." A radial direction is a direction orthogonal to the axis line Ax, and an xy plane is a plane orthogonal to the axial direction.

FIG. 1 is a plan view schematically illustrating a structure of an electric motor 1 according to a first embodiment of the present invention. An arrow Dl represents a circumferential direction of a stator 3 about the axis line Ax. The arrow Dl also represents a circumferential direction of the rotor 2 about the axis line Ax. The circumferential directions of the rotor 2 and the stator 3 will also be referred to simply as "circumferential directions."

Figure 2:
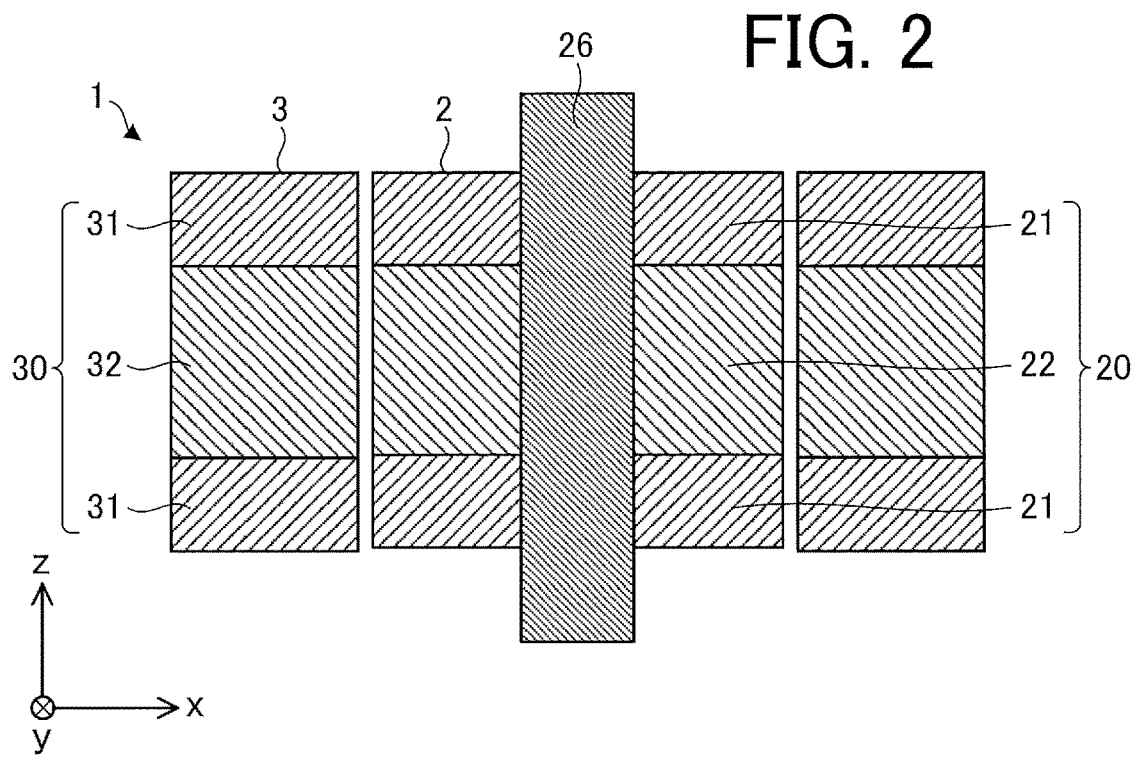
FIG. 2 is a cross-sectional view schematically illustrating a structure of the electric motor.

FIG. 2 is a cross-sectional view schematically illustrating a structure of the electric motor 1.

The electric motor 1 includes the rotor 2 and the stator 3. The electric motor 1 is, for example, a permanent magnet synchronous motor (also referred to as a brushless DC motor) such as an interior permanent magnet electric motor. In FIG. 1, stator windings 37 are detached from the stator 3.

The rotor 2 is rotatably disposed inside the stator 3. The rotor 2 includes a rotor core 20, at least one permanent magnet 23, and a shaft 26. As illustrated in FIG. 2, the rotor core 20 includes at least one first rotor core 21, and at least one second rotor core 22 adjacent to the first rotor core 21 in the axial direction.

In the example illustrated in FIG. 2, the rotor core 20 includes two first rotor cores 21 and one second rotor core 22, and the second rotor core 22 is disposed between the two first rotor cores 21. For example, the length of each first rotor core 21 in the axial direction is 7.5 mm, and the length of the second rotor core 22 in the axial direction is 15 mm. It should be noted that the number of first rotor cores 21 and the number of second rotor cores 22 are not limited to the example illustrated in FIG. 2, and arrangement of the first rotor cores 21 and the second rotor cores 22 is not limited to the example illustrated in FIG. 2.

An air gap between the rotor 2 and the stator 3 is, for example, 0.3 mm to 1 mm. When a current with a frequency in synchronization with an instructed rotation speed is supplied to the stator windings 37, a rotation magnetic field is generated in the stator 3 and thus the rotor 2 rotates.

The rotor core 20 (i.e., the first rotor cores 21 and the second rotor core 22) are fixed to the shaft 26 by, for example, shrink fitting or press fitting. When the rotor 2 rotates, rotation energy is transferred from the first rotor cores 21 and the second rotor core 22 to the shaft 26.

The first rotor cores 21 face the first stator cores 31 of the stator 3 in the radial direction. Each first rotor core 21 is formed by laminating a plurality of electromagnetic steel sheets 210 in the axial direction. These electromagnetic steel sheets 210 are fixed together by swaging. Each of the electromagnetic steel sheets 210 is previously punched into a predetermined shape. The thickness of each of the plurality of electromagnetic steel sheets 210 is, for example, 0.1 mm or more and 0.7 mm or less. In this embodiment, the thickness of each of the plurality of electromagnetic steel sheets 210 is 0.35 mm.

Figure 3:
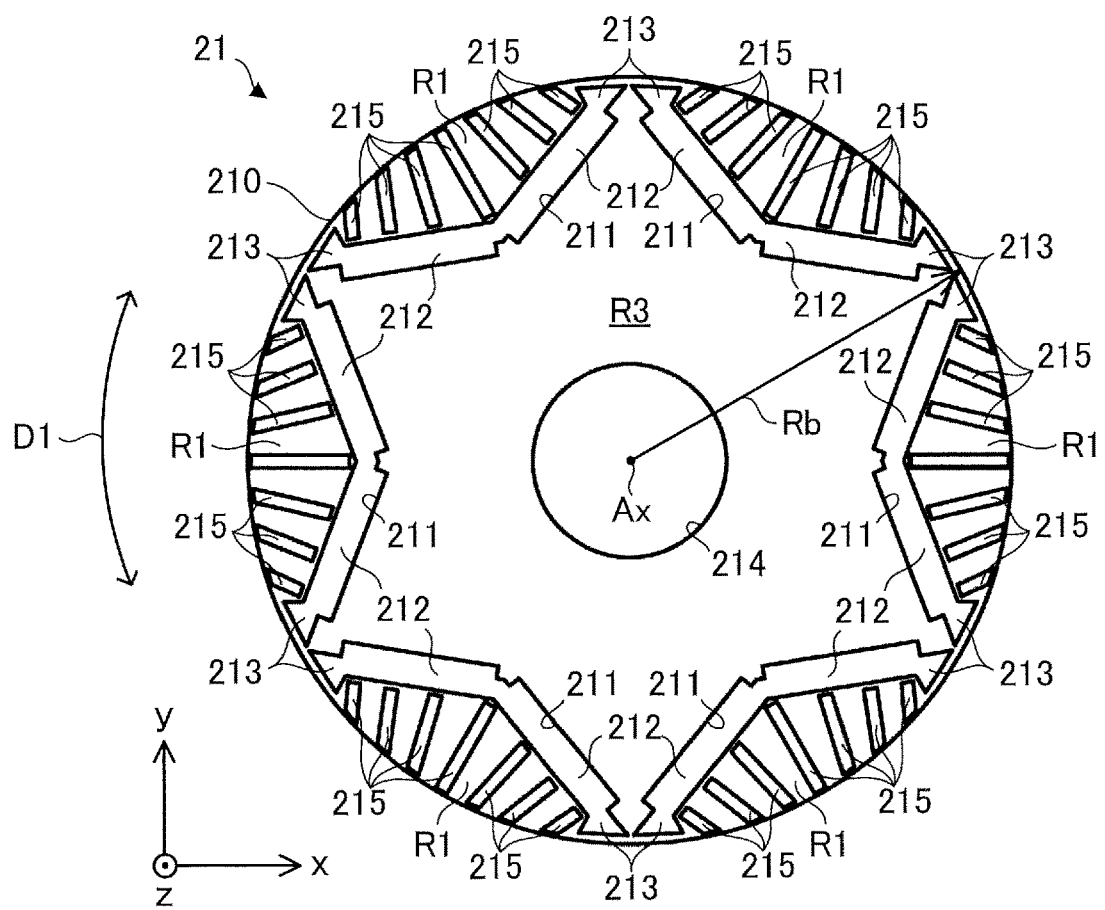
FIG. 3 is a plan view schematically illustrating a structure of a first rotor core.

FIG. 3 is a plan view schematically illustrating a structure of the first rotor core 21.

The first rotor core 21 includes at least one first hole 211, a first shaft insertion hole 214 in which the shaft 26 is inserted, and at least one hole 215. In the example illustrated in FIG. 3, the first rotor core 21 includes six first holes 211 arranged in the circumferential direction. That is, in the example illustrated in FIG. 3, the "at least one first hole 211" refers to the "six first holes 211." The radius of the first shaft insertion hole 214 is 2 mm to 3 mm, for example.

The first rotor core 21 includes first regions R1 and a third region R3. Each first region R1 is a region located outside one first hole 211 in the radial direction. The third region R3 is a region surrounded by the six first holes 211. That is, in the example illustrated in FIG. 3, the first rotor core 21 is divided into the six first regions R1, the one third region R3, and the six first holes 211. In the example illustrated in FIG. 3, the first rotor core 21 is a complete circle having a radius Rb in the xy plane.

As illustrated in FIG. 3, a plurality of holes 215 are formed in each first region R1. In the example illustrated in FIG. 3, six holes 215 are formed in each first region R1. For example, each hole 215 linearly extends in the xy plane. Each hole 215 is elongated in the radial direction. The shape of each hole 215 is not limited to the example illustrated in FIG. 3. For example, the shape of each hole 215 in the xy plane is a polygon or an arc.

In the xy plane, the width of each hole 215 in a lateral direction is, for example, 1 mm. A minimum distance between adjacent holes 215 is greater than or equal to the thickness of the electromagnetic steel sheet 210. For example, the minimum distance between adjacent holes 215 is 0.35 mm to 0.5 mm. Accordingly, each hole 215 can be formed easily.

In the xy plane, the length of each hole 215 in a longitudinal direction is greater than or equal to the thickness of the electromagnetic steel sheets 210. Accordingly, each hole 215 can be formed easily.

In each first region R1, each hole 215 is formed so as to be elongated toward a magnetic pole center part with approaching to an outer side in the radial direction. The magnetic pole center part is a center of the magnetic pole of the rotor 2 in the circumferential direction. The magnetic pole center part is located on a straight line passing through the rotation center of the rotor 2 and the center of the first hole 211 in the xy plane.

The distance between each hole 215 and the first hole 211 is preferably greater than or equal to the thickness of the electromagnetic steel sheets 210. In this case, each hole 215 and each first hole 211 can be formed easily.

In the example illustrated in FIG. 3, each first hole 211 includes at least one first magnet insertion part 212 in which the permanent magnet 23 is inserted, and at least one first flux barrier part 213 communicating with the first magnet insertion part 212. Each first hole 211 is, for example, a through hole, and each first hole 211 is formed in a V shape in the xy plane. Specifically, two first flux barrier parts 213 for reducing leakage magnetic flux are respectively formed at both ends of each first hole 211, and at least one first magnet insertion part 212 is formed between the two first flux barrier parts 213.

A portion outside the first flux barrier part 213 in the radial direction is a thin portion for reducing a short circuit of magnetic flux from the permanent magnet 23. The width of the thin portion in the radial direction is, for example, 0.35 mm. Accordingly, a short circuit between adjacent magnetic poles can be reduced.

Figure 4:
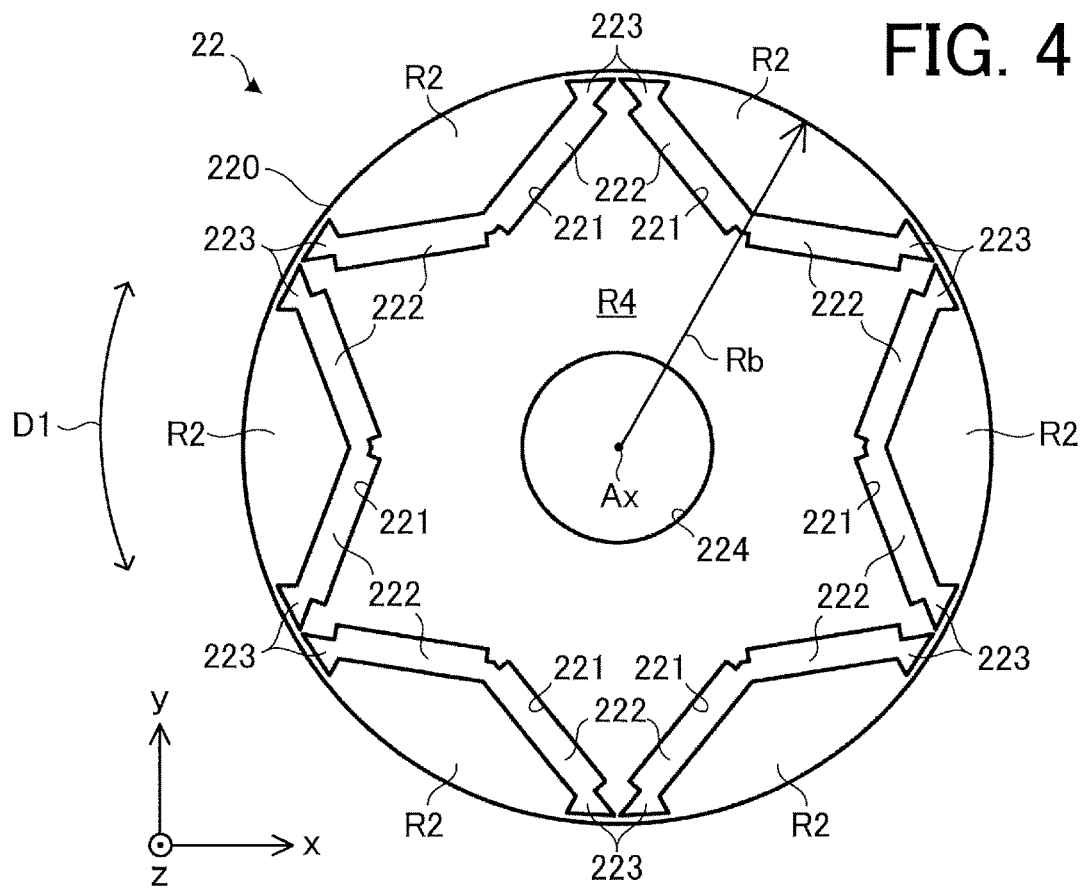
FIG. 4 is a plan view schematically illustrating a structure of a second rotor core.

FIG. 4 is a plan view schematically illustrating a structure of the second rotor core 22.

The second rotor core 22 faces the second stator core 32 of the stator 3 in the radial direction. The second rotor core 22 is formed by laminating a plurality of electromagnetic steel sheets 220 in the axial direction. These electromagnetic steel sheets 220 are fixed together by swaging. Each of the plurality of electromagnetic steel sheets 220 is previously punched into a predetermined shape. The thickness of each of the plurality of electromagnetic steel sheets 220 is, for example, 0.1 mm or more and 0.7 mm or less. In this embodiment, the thickness of each of the plurality of electromagnetic steel sheets 220 is 0.35 mm.

The second rotor core 22 includes at least one second hole 221 and a second shaft insertion hole 224 in which the shaft 26 is inserted. In the example illustrated in FIG. 4, the second rotor core 22 includes six second holes 221 arranged in the circumferential direction. That is, in the example illustrated in FIG. 4, the "at least one second hole 221" refers to the "six second holes 221." The radius of the second shaft insertion hole 224 is equal to the radius of the first shaft insertion hole 214, and is, for example, 2 mm to 3 mm.

The second rotor core 22 includes a second region R2 and a fourth region R4. The second region R2 is a region located outside one second hole 221 in the radial direction. The fourth region R4 is a region surrounded by the six second holes 221. That is, in the example illustrated in FIG. 4, the second rotor core 22 is divided into the six second regions R2, the one fourth region R4, and the six second holes 221. In the example illustrated in FIG. 4, the second rotor core 22 is a complete circle having a radius Rb in the xy plane.

In the example illustrated in FIG. 4, each second hole 221 includes at least one second magnet insertion part 222 in which the permanent magnet 23 is inserted, and at least one second flux barrier part 223 communicating with the second magnet insertion part 222. Each second hole 221 is, for example, a through hole. Each second hole 221 is formed in a V shape in the xy plane. Specifically, two second flux barrier parts 223 for reducing leakage magnetic flux are respectively formed at both ends of each second hole 221, and at least one second magnet insertion part 222 is formed between the two second flux barrier parts 223. Each second hole 221 communicates with each first hole 211 of the first rotor core 21.

A portion outside the second flux barrier part 223 in the radial direction is a thin portion for reducing a short circuit of magnetic flux from the permanent magnet 23. The width of the thin portion in the radial direction is, for example, 0.35 mm. Accordingly, a short circuit between adjacent magnetic poles can be reduced.

The number of the first holes 211 of the first rotor core 21 is equal to the number of magnetic poles of the rotor 2. Thus, the number of the second holes 221 of the second rotor core 22 is also equal to the number of magnetic poles of the rotor 2. As described above, each first hole 211 and each second hole 221 are formed in V shapes in the xy plane. Two permanent magnets 23 are inserted in a pair of the first hole 211 and the second hole 221 communicating with each other. Thus, these two permanent magnets 23 are disposed in a V shape in the xy plane and project inward in the radial direction. The two permanent magnets 23 inserted in one pair of the first hole 211 and the second hole 221 form one magnetic pole of the rotor 2. Each permanent magnet 23 has a flat plate shape.

Each permanent magnet 23 is magnetized in a direction orthogonal to the longitudinal direction of the permanent magnet 23 in the xy plane. That is, each permanent magnet 23 is magnetized in the lateral direction of the permanent magnet 23 in the xy plane. In one magnetic pole of the rotor 2, one pair of permanent magnets 23 (specifically, two permanent magnets 23) functions as a north pole or a south pole with respect to the stator 3. Thus, in this embodiment, the rotor 2 includes six poles. Each permanent magnet 23 is, for example, a rare earth magnet including neodymium, iron, and boron.

In this embodiment, the first rotor core 21 includes the plurality of holes 215, whereas the second rotor core 22 includes no holes corresponding to the holes 215. That is, the volume of each first region R1 is smaller than the volume of each second region R2. Thus, the volume of all the first rotor cores 21 in the rotor 2 is smaller than the volume of all the second rotor cores 22 in the rotor 2. In this embodiment, the volume of each first rotor core 21 is smaller than the volume of each second rotor core 22.

It should be noted that a hole corresponding to the hole 215 may be formed in the second region R2 of the second rotor core 22. In this case, in the xy plane, the area of each hole 215 in the first rotor core 21 is larger than the area of a hole formed in the second region R2 of the second rotor core 22.

Figure 5:
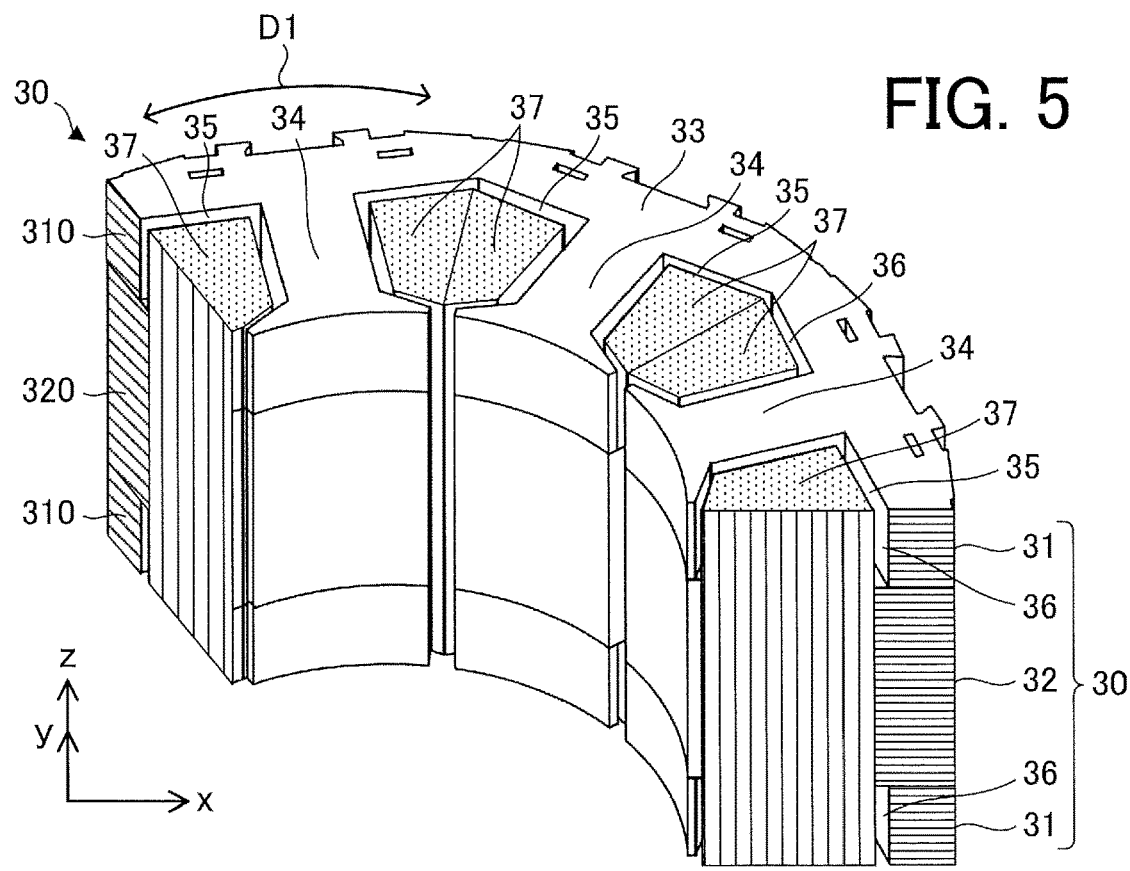
FIG. 5 is a perspective view schematically illustrating a structure of a part of a stator.

FIG. 5 is a perspective view schematically illustrating a structure of a part of the stator 3.

The stator 3 includes a stator core 30, the stator windings 37, slots 35 in which the stator windings 37 are disposed, and at least one depression 36. The stator core 30 includes the first stator cores 31 and the second stator core 32 laminated in the axial direction.

In the example illustrated in FIG. 5, the stator core 30 includes two first stator cores 31 and one second stator core 32, and the one second stator core 32 is disposed between the two first stator cores 31. For example, the length of one first stator core 31 in the axial direction is 7.5 mm, and the length of the second stator core 32 in the axial direction is 15 mm. It should be noted that the number of first stator cores 31 and the number of second stator cores 32 are not limited to the example illustrated in FIG. 5, and arrangement of the first stator cores 31 and the second stator cores 32 are not limited to the example illustrated in FIG. 5.

Figure 6:
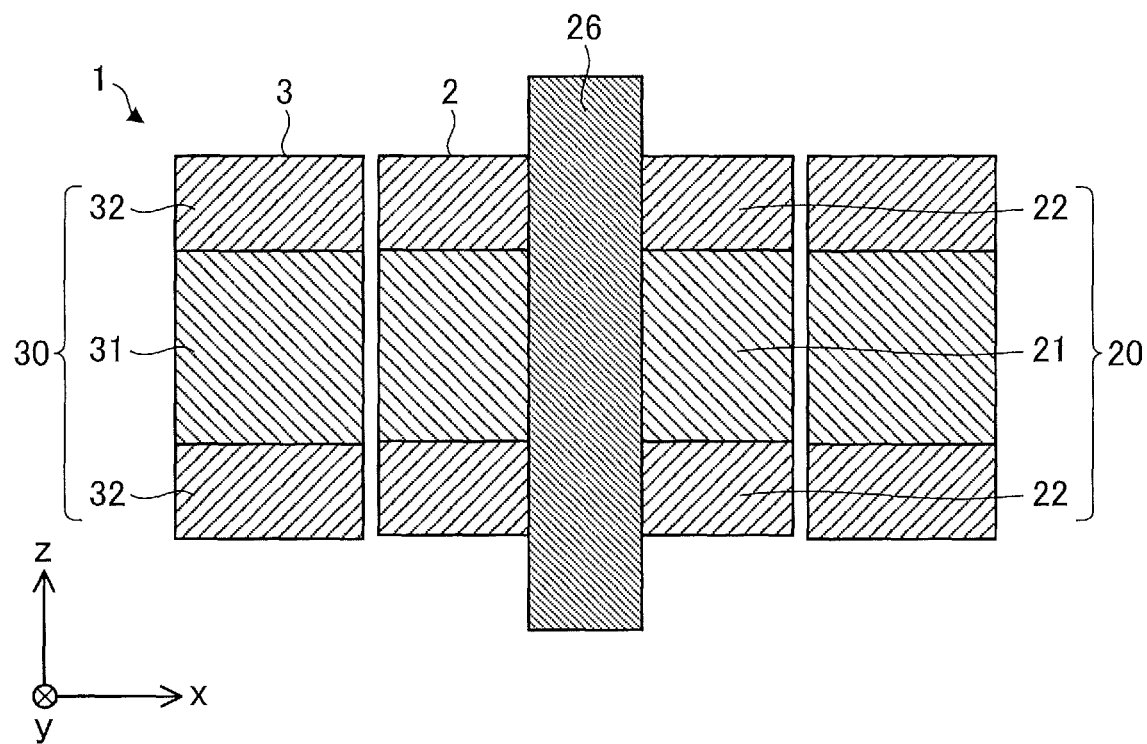
FIG. 6 is a cross-sectional view illustrating another example of the electric motor.
Figure 7:
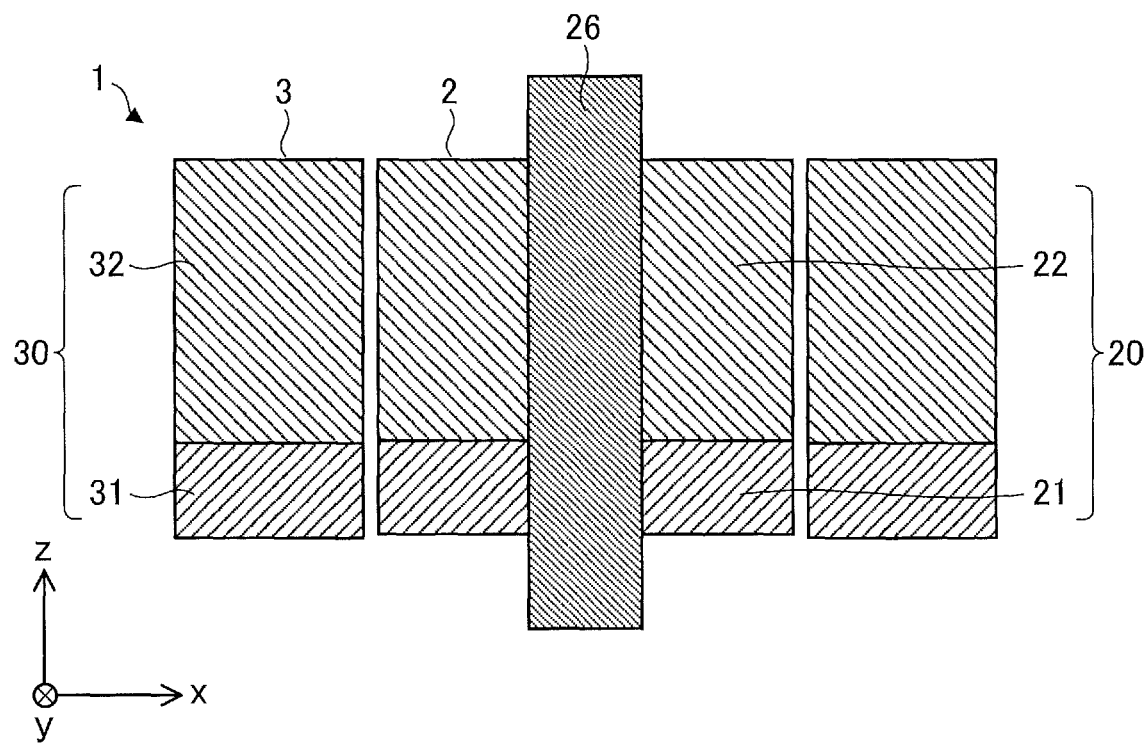
FIG. 7 is a cross-sectional view illustrating yet another example of the electric motor.
Figure 8:
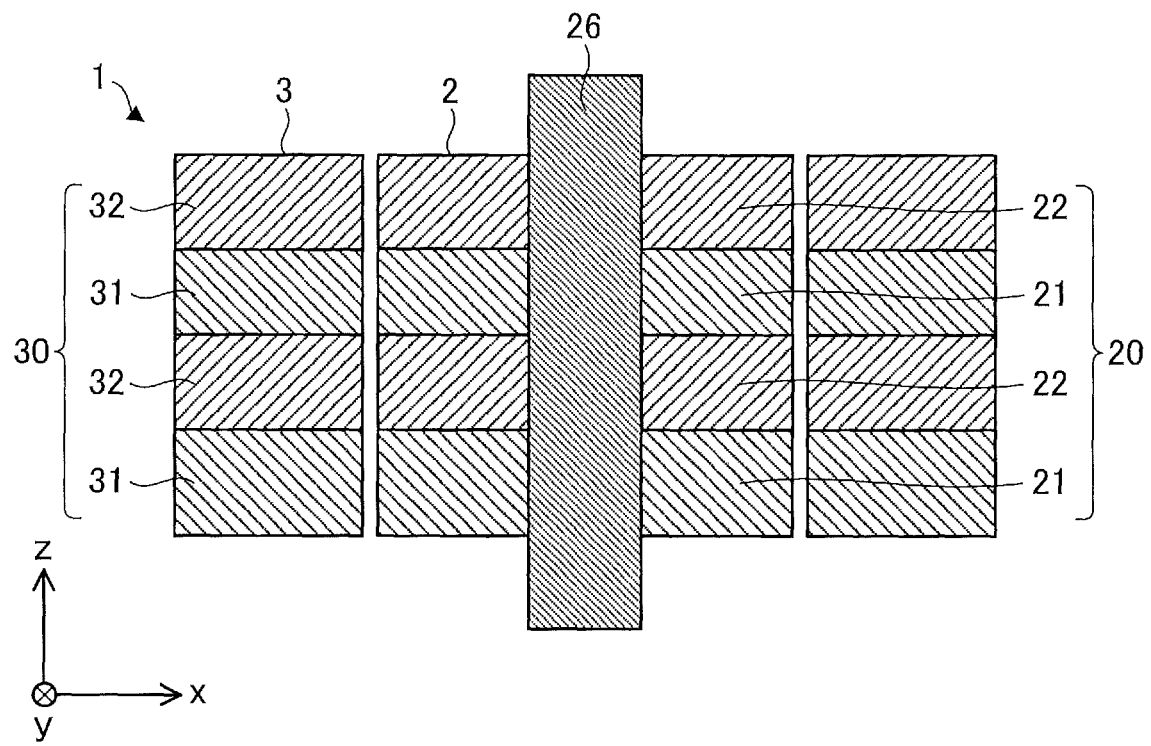
FIG. 8 is a cross-sectional view illustrating still another example of the electric motor.

FIGS. 6 through 8 are cross-sectional views illustrating other examples of the electric motor 1.

As illustrated in FIG. 6, the first rotor core 21 and the first stator core 31 may be disposed between the second rotor cores 22 and between the second stator cores 32, respectively.

As illustrated in FIG. 7, the rotor core 20 may be constituted by one first rotor core 21 and one second rotor core 22, and the stator core 30 may be constituted by one first stator core 31 and one second stator core 32. In this case, in the axial direction, the second rotor core 22 and the second stator core 32 are longer than the first rotor core 21 and the first stator core 31, respectively.

As illustrated in FIG. 8, the first rotor cores 21 and the second rotor cores 22 may be alternately arranged, and the first stator cores 31 and the second stator cores 32 may be alternately arranged.

As illustrated in FIG. 5, the stator core 30 includes a yoke 33 extending in the circumferential direction, a plurality of teeth 34 extending in the radial direction from the yoke 33, a plurality of slots 35, and at least one depression 36. In this embodiment, nine teeth 34 are arranged at regular intervals. Each slot 35 is a space between adjacent ones of the teeth 34.

Figure 9:
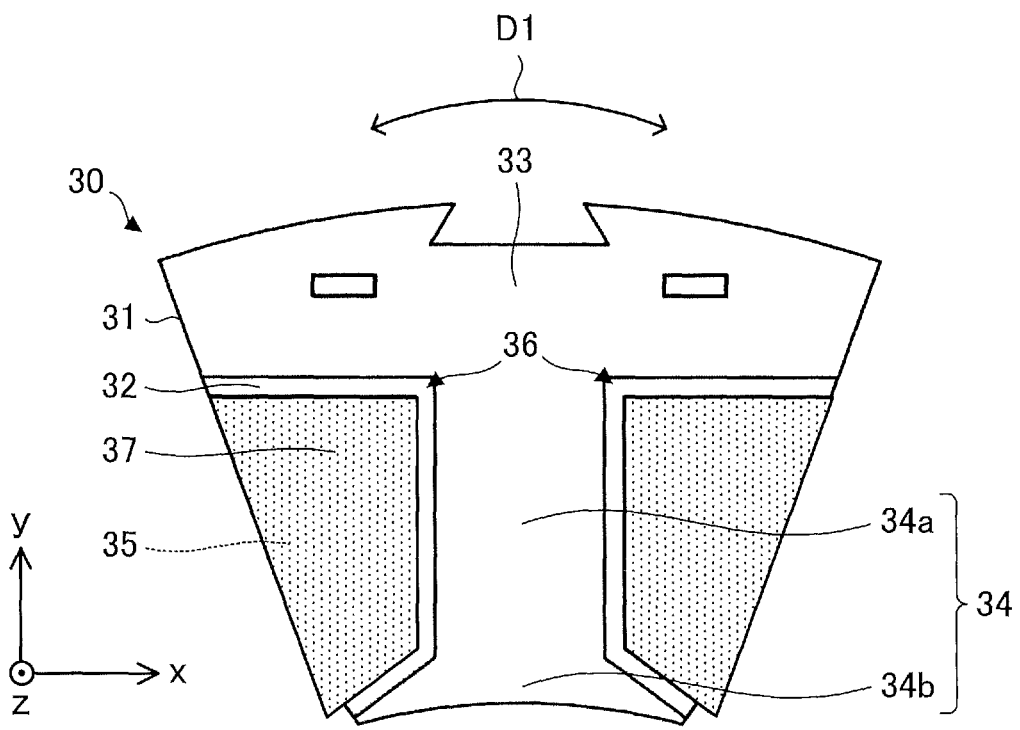
FIG. 9 is a top view schematically illustrating a structure of a part of the stator core illustrated in FIG. 5.

FIG. 9 is a top view schematically illustrating a structure of a part of the stator core 30 illustrated in FIG. 5.

Figure 10:
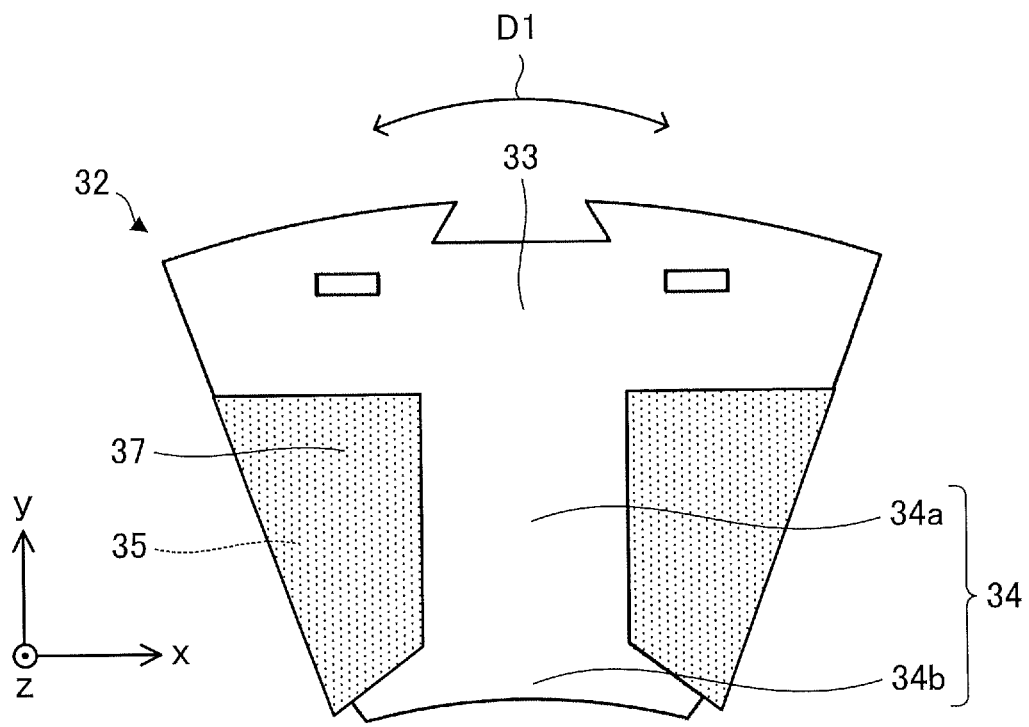
FIG. 10 is a plan view schematically illustrating a structure of a part of the second stator core.

FIG. 10 is a plan view schematically illustrating a structure of a part of the second stator core 32.

Each of the teeth 34 projects from the yoke 33 toward the rotation center of the rotor 2. Each of the teeth 34 includes a body 34a extending in the radial direction, and a teeth front end 34b formed at the front end of the body 34a and extending in the circumferential direction.

The stator winding 37 is wound around each of the teeth 34, whereby the stator winding 37 is disposed in each slot 35. For example, the stator winding 37 is wound around each of the teeth 34 by concentrated winding. An insulator is preferably disposed between the stator winding 37 and each of the teeth 34.

The stator winding 37 forms a coil for generating a rotation magnetic field. The coil has, for example, three phases, and a wiring type thereof is, for example a Y connection. The stator winding 37 is, for example, a magnet wire having a diameter of 1 mm. When a current flows through the stator winding 37, a rotation magnetic field occurs. The number of windings and diameter of the stator winding 37 are set in accordance with, for example, a voltage applied to the stator winding 37, the rotation speed of the electric motor 1, or the cross-sectional area of the slot 35.

The first stator core 31 is formed in an annular shape. The first stator core 31 is formed by laminating a plurality of electromagnetic steel sheets 310 in the axial direction. These electromagnetic steel sheets 310 are fixed together by swaging. Each of the electromagnetic steel sheets 310 is previously punched into a predetermined shape. The thickness of each of the plurality of electromagnetic steel sheets 310 is, for example, 0.1 mm or more and 0.7 mm or less. In this embodiment, the thickness of each of the plurality of electromagnetic steel sheets 310 is 0.35 mm.

The second stator core 32 is formed in an annular shape. The second stator core 32 is formed by laminating a plurality of electromagnetic steel sheets 320 in the axial direction. These electromagnetic steel sheets 320 are fixed together by swaging. Each of the plurality of electromagnetic steel sheets 320 is previously punched into a predetermined shape. The thickness of each of the plurality of electromagnetic steel sheets 320 is, for example, 0.1 mm or more and 0.7 mm or less. In this embodiment, the thickness of each of the plurality of electromagnetic steel sheets 320 is 0.35 mm.

As described above, each of the first stator core 31 and the second stator core 32 includes the plurality of teeth 34. Each of the first stator core 31 and the second stator core 32 also includes the yoke 33.

As illustrated in FIGS. 5 and 9, the width of the yoke 33 of the first stator core 31 in the radial direction (i.e., the width in the y-axis direction in FIG. 9) is smaller than the width of the yoke 33 of the second stator core 32 (i.e., the width in the y-axis direction in FIG. 10). Thus, the depression 36 is formed in the stator core 30. In other words, a gap is formed between the yoke 33 of the first stator core 31 and the stator winding 37.

In addition, the width of the body 34a of the first stator core 31 in a direction orthogonal to the radial direction (i.e., the width in the x-axis direction in FIG. 9) is smaller than the width of the body 34a of the second stator core 32 (i.e., the width in the x-axis direction in FIG. 10). In addition, the width of the teeth front end 34b of the first stator core 31 in the radial direction is smaller than the width of the teeth front end 34b of the second stator core 32. Accordingly, a gap is formed between the teeth 34 of the first stator core 31 and the stator winding 37. As a result, the depression 36 is formed in the stator core 30.

As described above, the width of the yoke 33 of the first stator core 31 is smaller than the width of the yoke 33 of the second stator core 32, and the width of the teeth 34 of the first stator core 31 is smaller than the width of the teeth 34 of the second stator core 32. Thus, in the xy plane, the area of the slot 35 in the first stator core 31 is larger than the area of the slot 35 in the second stator core 32.

The depression 36 is formed at a position facing the slot 35. As illustrated in FIGS. 5 and 9, the depression 36 does not touch the stator winding 37. In this case, the depression 36 is a side surface of the yoke 33 of the first stator core 31 and also is a side surface of the teeth 34.

The first stator core 31 may include an electromagnetic steel sheet having the same structure as the structure of the electromagnetic steel sheets 320 of the second stator core 32 as long as the first stator core 31 includes at least one electromagnetic steel sheet 310 having a width smaller than the width of the yoke 33 of the second stator core 32. Similarly, the first stator core 31 may include an electromagnetic steel sheet having the same structure as the structure of the electromagnetic steel sheets 320 of the second stator core 32 as long as the first stator core 31 includes at least one electromagnetic steel sheet 310 having a width smaller than the width of the teeth front end 34b of the second stator core 32.

Figure 11:
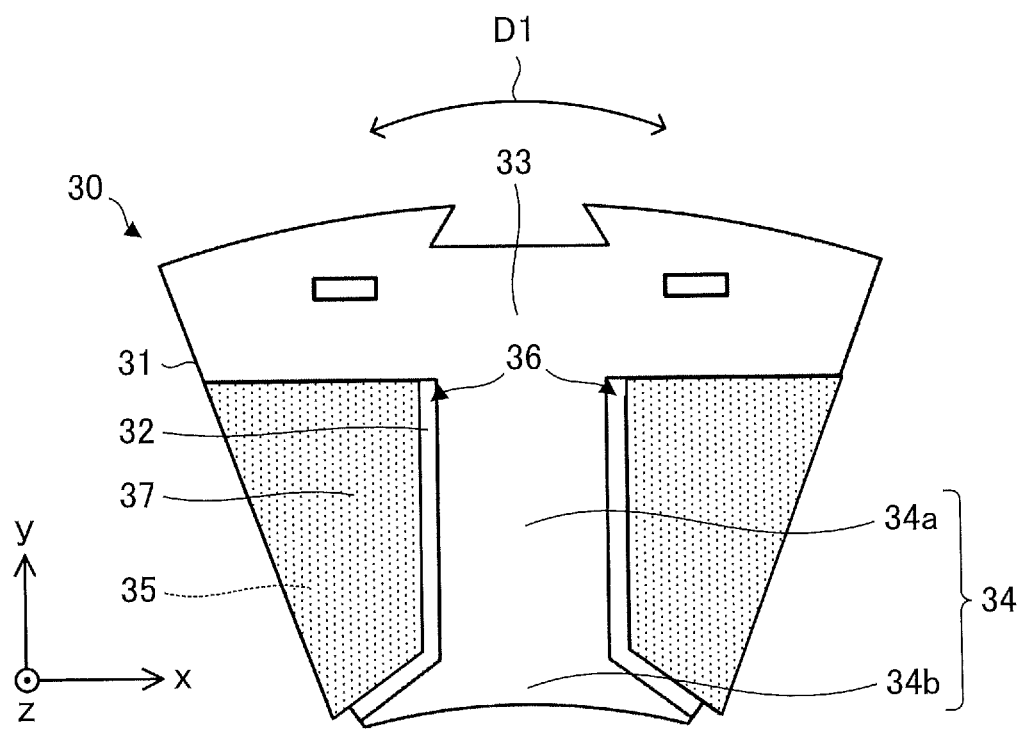
FIG. 11 is a diagram illustrating another structure of a yoke and a tooth of the first stator core.
Figure 12:
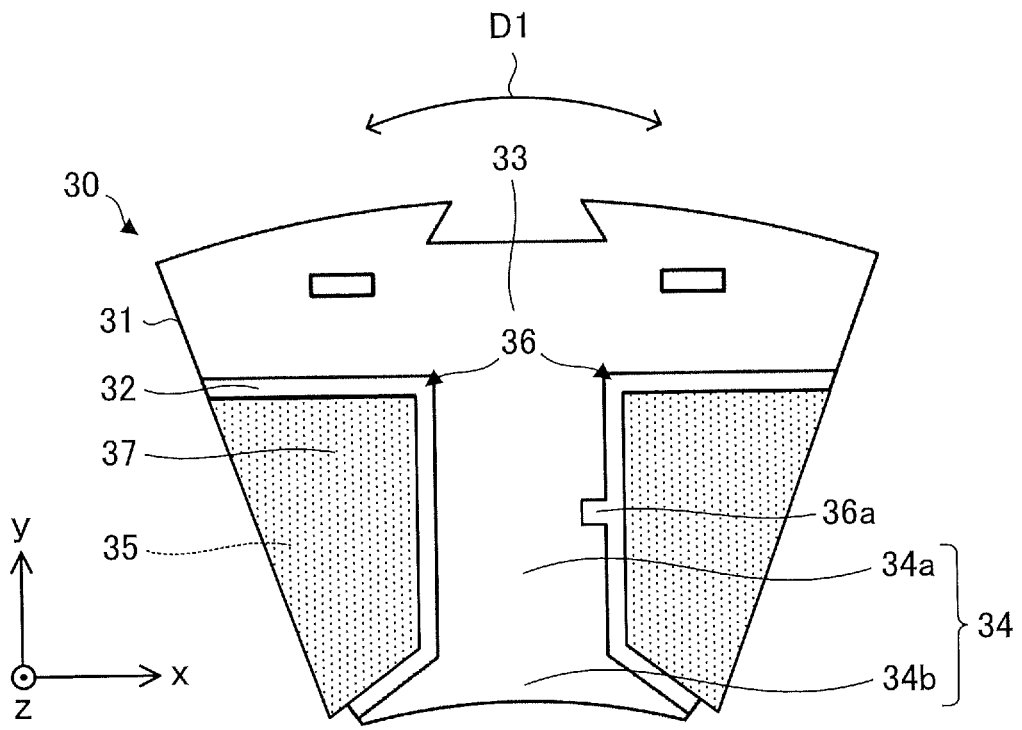
FIG. 12 is a diagram illustrating yet another structure of the yoke and the tooth of the first stator core.
Figure 13:
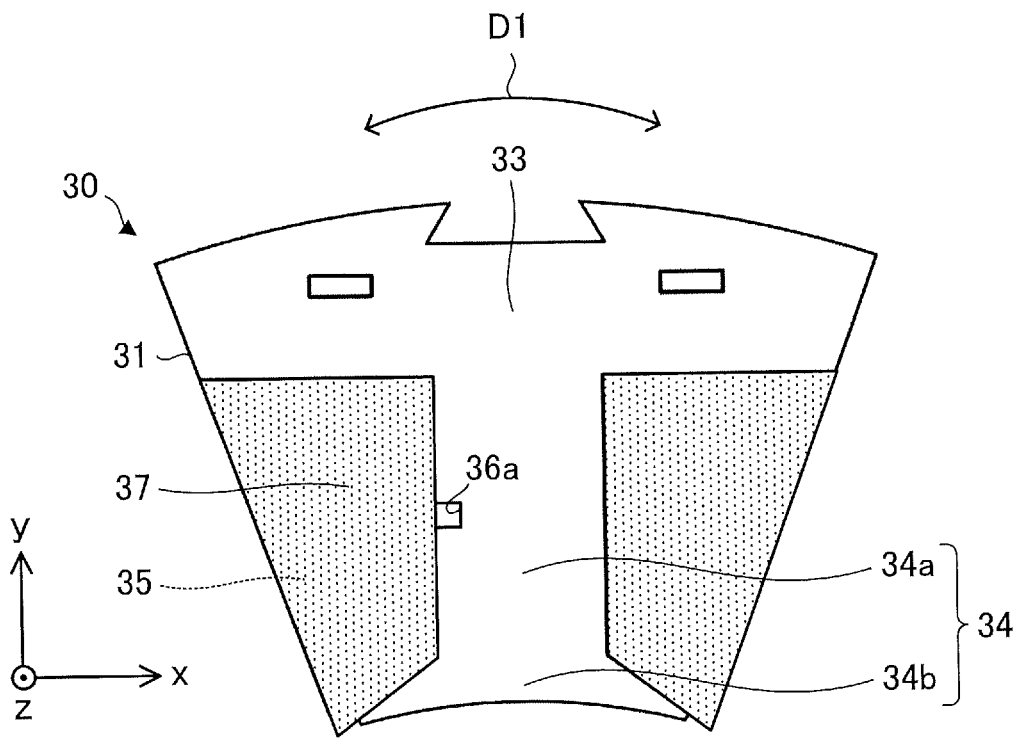
FIG. 13 is a diagram illustrating still another structure of the yoke and the tooth of the first stator core.

FIGS. 11 through 13 are diagrams illustrating other structures of the yoke 33 and the tooth 34 of the first stator core 31.

In the example illustrated in FIG. 11, the width of the yoke 33 of the first stator core 31 in the radial direction is equal to the width of the yoke 33 of the second stator core 32, and the width of the body 34a of the first stator core 31 in a direction orthogonal to the radial direction is smaller than the width of the body 34a of the second stator core 32. In addition, the width of the teeth front end 34b of the first stator core 31 in the radial direction is smaller than the width of the teeth front end 34b of the second stator core 32. Accordingly, a gap is formed between the tooth 34 of the first stator core 31 and the stator winding 37. As a result, the depression 36 is formed in the stator core 30.

In the example illustrated in FIG. 12, a recess 36a is formed in the body 34a of the first stator core 31. Accordingly, a gap that is larger than a gap in the first stator core 31 illustrated in FIG. 9 is formed between the teeth 34 and the stator winding 37. In this manner, current leakage from the stator winding 37 to the tooth 34 of the first stator core 31 can be further reduced. The size and shape of the recess 36a are not limited to the example illustrated in FIG. 12.

In the example illustrated in FIG. 13, a recess 36a is formed in the body 34a of the first stator core 31. Accordingly, a gap is formed between the tooth 34 of the first stator core 31 and the stator winding 37. As a result, the depression 36 is formed in the stator core 30. The size and shape of the recess 36a are not limited to the example illustrated in FIG. 13.

Advantages of the electric motor 1 according to the first embodiment will be described.

In this embodiment, the width of the yoke 33 of the first stator core 31 in the radial direction is smaller than the width of the yoke 33 of the second stator core 32. In other words, the stator 3 includes at least one depression 36. Accordingly, a capacitance of the stator core 30 can be reduced, and thus reliability of the electric motor 1 can be enhanced. In addition, in the example illustrated in FIGS. 5 and 9, since the gap is formed between the yoke 33 of the first stator core 31 and the stator winding 37, leakage of current from the stator winding 37 to the yoke 33 of the first stator core 31 can be reduced. Furthermore, since the gap is formed between the teeth 34 of the first stator core 31 and the stator winding 37, leakage of current from the stator winding 37 to the teeth 34 of the first stator core 31 can be reduced.

On the other hand, the depression 36 is formed in the stator 3, specifically in the stator core 30, and thus, the area of the first rotor core 21 in the xy plane is smaller than the area of the second stator core 32. Accordingly, magnetic saturation easily occurs in the first stator core 31, and thus, an iron loss tends to increase in the first stator core 31. Consequently, motor efficiency may increase.

In such a case, in the electric motor 1 according to this embodiment, the volume of each first region R1 of the first rotor core 21 is smaller than the volume of each second region R2 of the second rotor core 22, and accordingly, the volume of all the first rotor cores 21 in the rotor 2 is smaller than the volume of all the second rotor cores 22 in the rotor 2. Specifically, in the example illustrated in FIG. 3, the hole 215 is formed in the first regions R1 of at least one first stator core 31. This hole 215 function as magnetic resistance in a magnetic circuit of the first rotor core 21. Accordingly, the amount of magnetic flux flowing from the first rotor core 21 into the first stator core 31 decreases, magnetic saturation in the first stator core 31 can be reduced, and an iron loss can be reduced.

The amount of magnetic flux flowing from the first rotor core 21 into the first stator core 31 is smaller than the amount of magnetic flux flowing from the second rotor core 22 into the second stator core 32. Thus, maximum magnetic flux density from the magnetic pole center part of the first rotor core 21 in the radial direction of magnetic flux is smaller than maximum magnetic flux density of the magnetic pole center part of the second rotor core 22 in the radial direction of magnetic flux. Specifically, magnetic flux from the magnetic pole center part of the first rotor core 21 in the radial direction is magnetic flux from the outer peripheral surface of the first rotor core 21, and magnetic flux from the magnetic pole center part of the second rotor core 22 in the radial direction is magnetic flux from the outer peripheral surface of the second rotor core 22.

In this embodiment, magnetic flux from the magnetic pole center part of the first rotor core 21 in the radial direction amounts to 1.038[T], and magnetic flux from the magnetic pole center part of the second rotor core 22 in the radial direction amounts to 1.094[T]. In this case, an iron loss in the first stator core 31 is reduced by 3% as compared to the second stator core 32. This can reduce magnetic saturation in the first stator core 31. As a result, an iron loss in the first stator core 31 can be reduced.

As described above, in the electric motor 1 according to this embodiment, capacitance of the stator core 30 can be reduced, magnetic saturation in the first stator core 31 can be reduced, and an iron loss can be reduced. As a result, reliability and efficiency of the electric motor 1 can be enhanced.

Other examples of the first rotor core 21 or the second rotor core 22 described in the first embodiment will now be described as variations.

First Variation

Figure 14:
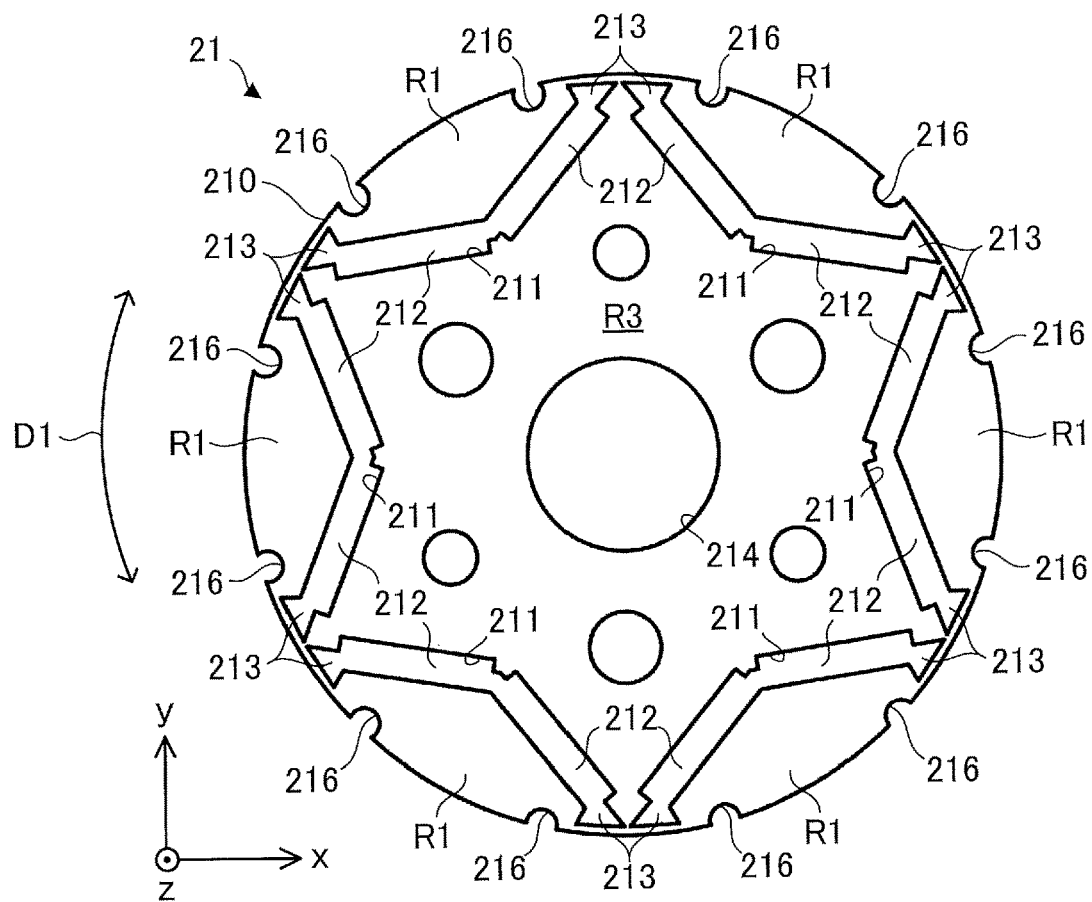
FIG. 14 is a plan view schematically illustrating a structure of a first rotor core according to a first variation.

FIG. 14 is a plan view schematically illustrating a structure of the first rotor core 21 in the first variation.

Figure 15:
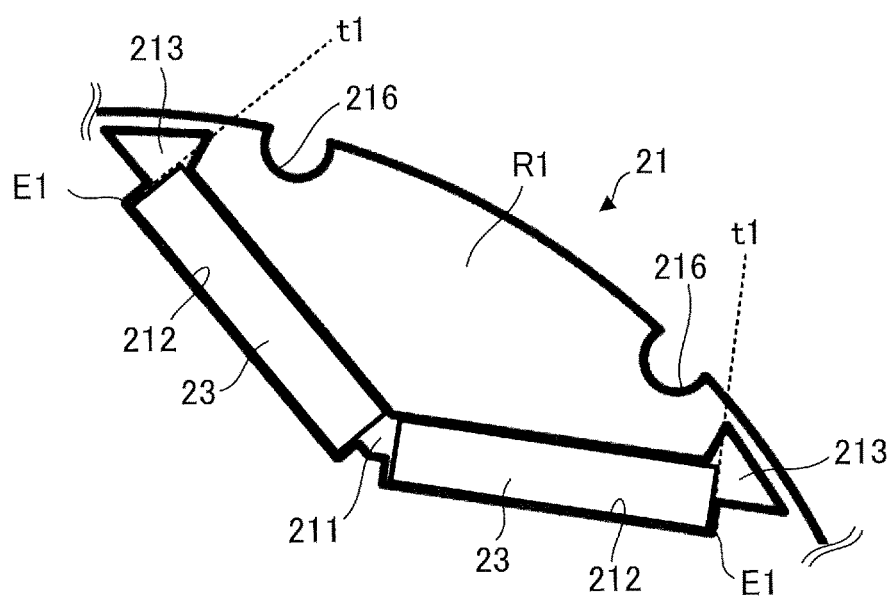
FIG. 15 is an enlarged view illustrating a structure of a part of the first rotor core illustrated in FIG. 14.

FIG. 15 is an enlarged view illustrating a structure of a part of the first rotor core 21 illustrated in FIG. 14.

The first rotor core 21 in the first variation includes at least one recess 216 formed in the outer peripheral surface of the first region R1, and does not include the hole 215. Except for these points, the first rotor core 21 in the first variation is the same as the first rotor core 21 described in the first embodiment.

The first rotor core 21 may include an electromagnetic steel sheet 210 having no recess 216 as long as the first rotor core 21 includes at least one electromagnetic steel sheet 210 having at least one recess 216.

The shape of the recess 216 in the xy plane is, for example, an arc or a polygon. The distance between two recesses 216 is preferably greater than or equal to the thickness of one electromagnetic steel sheet 210. This eases formation of the recess 216.

In the example illustrated in FIG. 14, a plurality of recesses 216 are formed in the outer peripheral surface of the first region R1 of the first rotor core 21. In this case, as illustrated in FIG. 15, these recesses 216 are preferably formed at the inner sides, in the circumferential direction, of both ends E1 of one pair of permanent magnets 23 in the first hole 211. In the example illustrated in FIG. 15, these recesses 216 are formed inside extension lines t1 of both end surfaces of one pair of permanent magnets 23 in the circumferential direction. Accordingly, these recesses 216 function as magnetic resistance in a magnetic circuit between the first rotor core 21 and the first stator core 31. In this manner, the amount of magnetic flux flowing from the first rotor core 21 into the first stator core 31 decreases, magnetic saturation in the first stator core 31 can be reduced, and an iron loss can be reduced.

In the first variation, the sum of the lengths of the first stator cores 31 in the axial direction is 20 mm, and the sum of the lengths of the second stator cores 32 in the axial direction is 25 mm. Each recess 216 has a radius of 1 mm, and is formed at a location away from the magnetic pole center part by 6.5 mm in the circumferential direction. In this case, magnetic flux from the magnetic pole center part of the first rotor core 21 amounts to 0.885[T], and magnetic flux from the magnetic pole center part of the second rotor core 22 in the radial direction amounts to 0.932[T]. In this case, an iron loss in the first stator core 31 is reduced by 2% as compared to the second stator core 32. This can reduce magnetic saturation in the first stator core 31. As a result, an iron loss in the first stator core 31 can be reduced.

In addition, since the plurality of recesses 216 are formed in the outer peripheral surface of the first region R1 of the first rotor core 21, in a manner similar to the first embodiment, the volume of all the first rotor cores 21 (specifically, the volume of the first regions R1) in the rotor 2 is smaller than the volume of all the second rotor cores 22 (specifically, the volume of the second regions R2) in the rotor 2. Thus, as described in the first embodiment, capacitance of the stator core 30 can be reduced, magnetic saturation in the first stator core 31 can be reduced, and an iron loss can be reduced. In particular, since a large air gap is formed between the recess 216 and the first stator core 31, magnetic saturation can be significantly reduced in this air gap. As a result, reliability and efficiency of the electric motor 1 can be enhanced.

Second Variation

Figure 16:
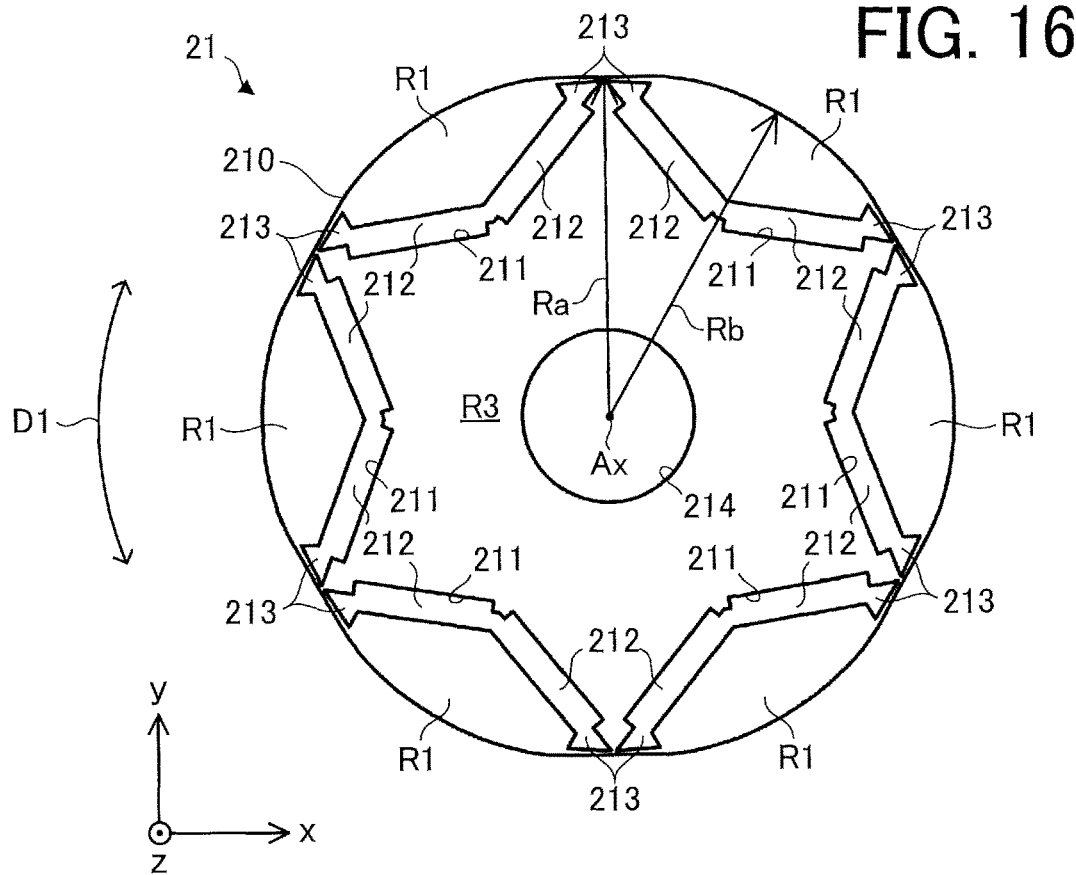
FIG. 16 is a plan view schematically illustrating a structure of a first rotor core according to a second variation.

FIG. 16 is a plan view schematically illustrating a structure of the first rotor core 21 in a second variation.

The first rotor core 21 in the second variation has a first radius Rb and a second radius Ra smaller than the first radius Rb in the xy plane. In the first rotor core 21 illustrated in FIG. 16, the first radius Rb is a radius at the magnetic pole center part, and the second radius Ra is a radius at an inter-pole part. The inter-pole part is a boundary between two magnetic poles that are adjacent to each other in the circumferential direction. In a manner similar to the first embodiment, the second rotor core 22 is a complete circle having a radius equal to the first radius Rb in the xy plane.

The first rotor core 21 may include an electromagnetic steel sheet having no second radius Ra as long as the first rotor core 21 includes at least one electromagnetic steel sheet 210 having the second radius Ra smaller than the first radius Rb.

In the second variation, since the first rotor core 21 has the first radius Rb and the second radius Ra smaller than the first radius Rb in the xy plane, the volume of all the first rotor cores 21 in the rotor 2 is smaller than the volume of all the second rotor cores 22 in the rotor 2 in a manner similar to the first embodiment. Thus, as described in the first embodiment, capacitance of the stator core 30 can be reduced, magnetic saturation in the first stator core 31 can be reduced, and an iron loss can be reduced. In particular, since an air gap at the inter-pole part of the first rotor core 21 is large, magnetic saturation can be significantly reduced in this air gap. As a result, reliability and efficiency of the electric motor 1 can be enhanced.

Third Variation

Figure 17:
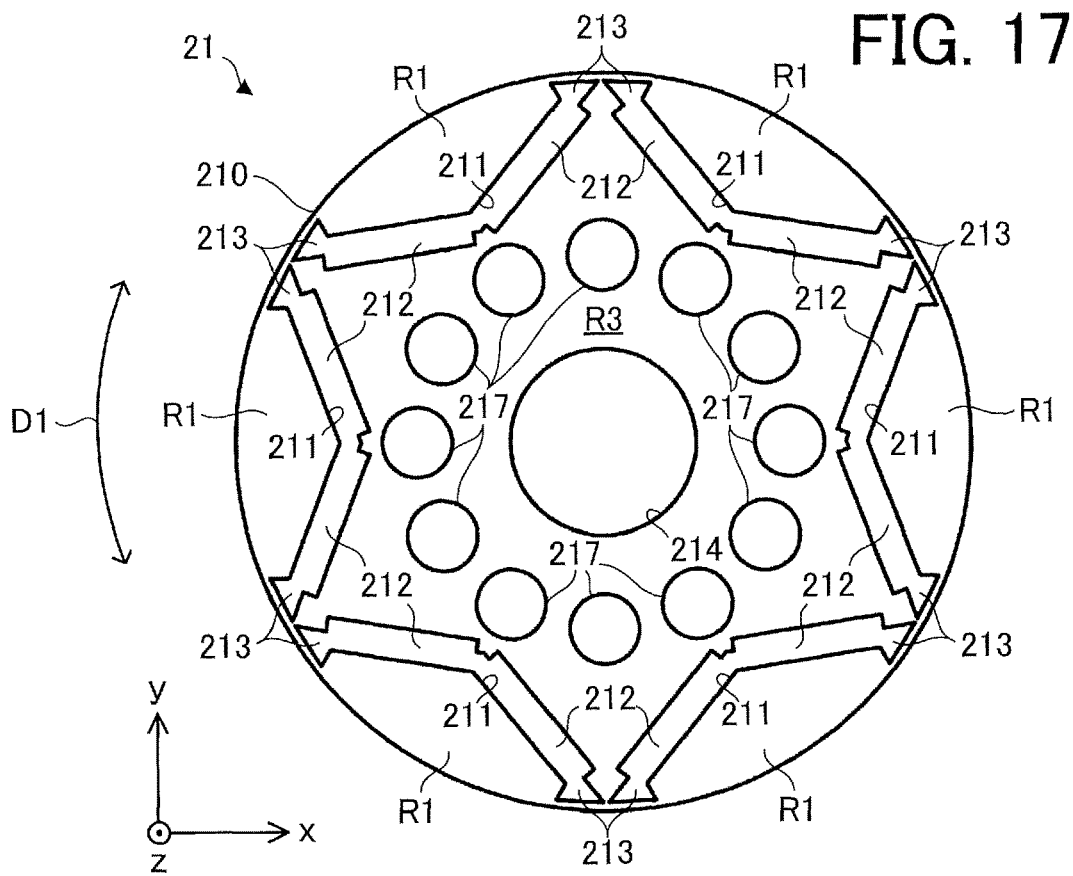
FIG. 17 is a plan view schematically illustrating a structure of a first rotor core according to a third variation.

FIG. 17 is a plan view schematically illustrating a structure of the first rotor core 21 in a third variation.

The first rotor core 21 in the third variation has a plurality of holes 217 arranged in the circumferential direction in the third region R3, and does not have the holes 215. Except for these points, the first rotor core 21 in the third variation is the same as the first rotor core 21 described in the first embodiment.

Specifically, the plurality of holes 217 are arranged in the circumferential direction between the plurality of first holes 211 and the first shaft insertion hole 214. The shape of each hole 217 in the xy plane may be a circle or a polygon, and is not limited to the example illustrated in FIG. 17.

The first rotor core 21 may include an electromagnetic steel sheet not having the plurality of holes 217 as long as the first rotor core 21 includes at least one electromagnetic steel sheet 210 having a plurality of holes 217.

The center of each hole 217 in the xy plane coincides with the magnetic pole center part or the inter-pole part. The radius of each hole 217 in the xy plane is, for example, 2 mm to 3 mm.

Each of the distance between adjacent holes 217, the distance between each hole 217 and the first shaft insertion hole 214, and the distance between each hole 217 and the first hole 211 is greater than or equal to the thickness of the electromagnetic steel sheet 210. Accordingly, each hole 217 can be formed easily.

In the third region R3 of the first rotor core 21, since the plurality of holes 217 are arranged in the circumferential direction, in a manner similar to the first embodiment, the volume of all the first rotor cores 21 (specifically, the volume of the third region R3) in the rotor 2 is smaller than the volume of all the second rotor cores 22 (specifically, the volume of the fourth region R4) in the rotor 2. In addition, each hole 217 functions as magnetic resistance in the first rotor core 21. Accordingly, the amount of magnetic flux flowing from the first rotor core 21 into the first stator core 31 decreases.

Thus, as described in the first embodiment, capacitance of the stator core 30 can be reduced, and magnetic saturation in the first stator core 31 can be reduced. As a result, an iron loss can be reduced. As a result, reliability and efficiency of the electric motor 1 can be enhanced.

Fourth Variation

Figure 18:
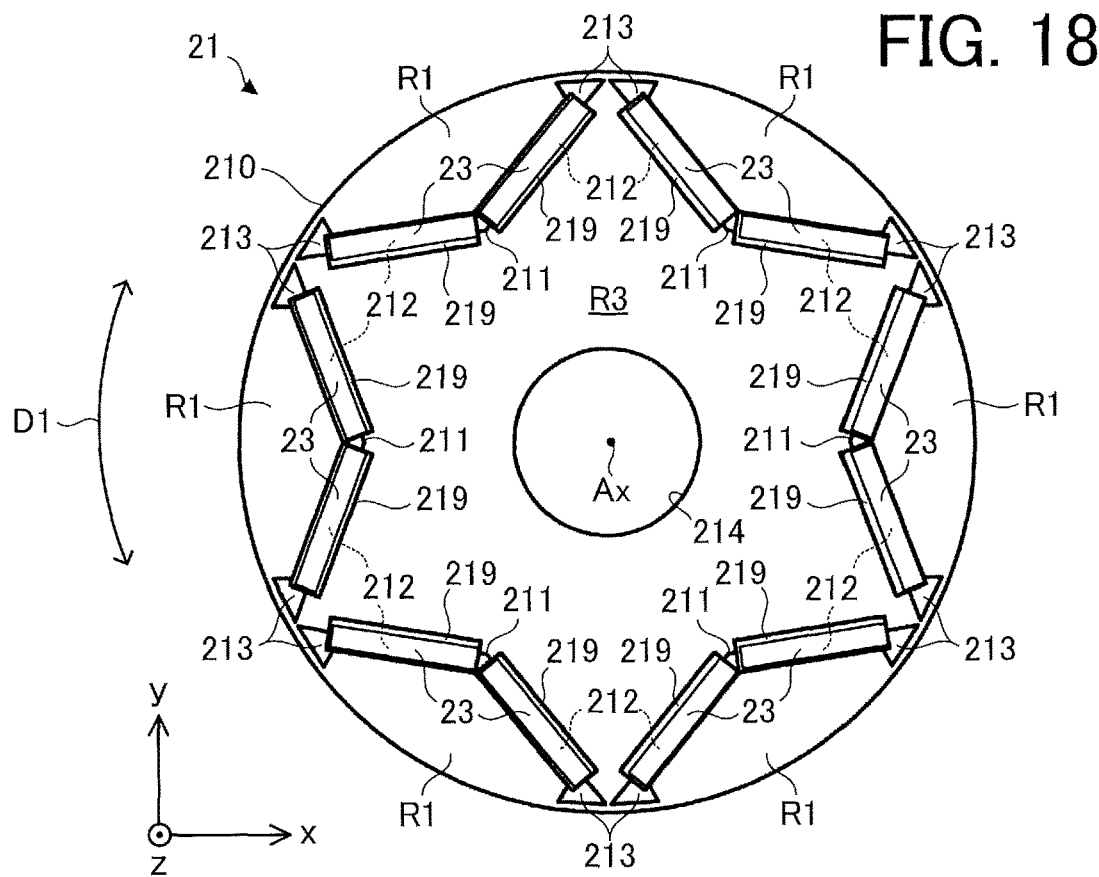
FIG. 18 is a plan view schematically illustrating a structure of a first rotor core according to a fourth variation.

FIG. 18 is a plan view schematically illustrating a structure of the first rotor core 21 in a fourth variation.

Figure 19:
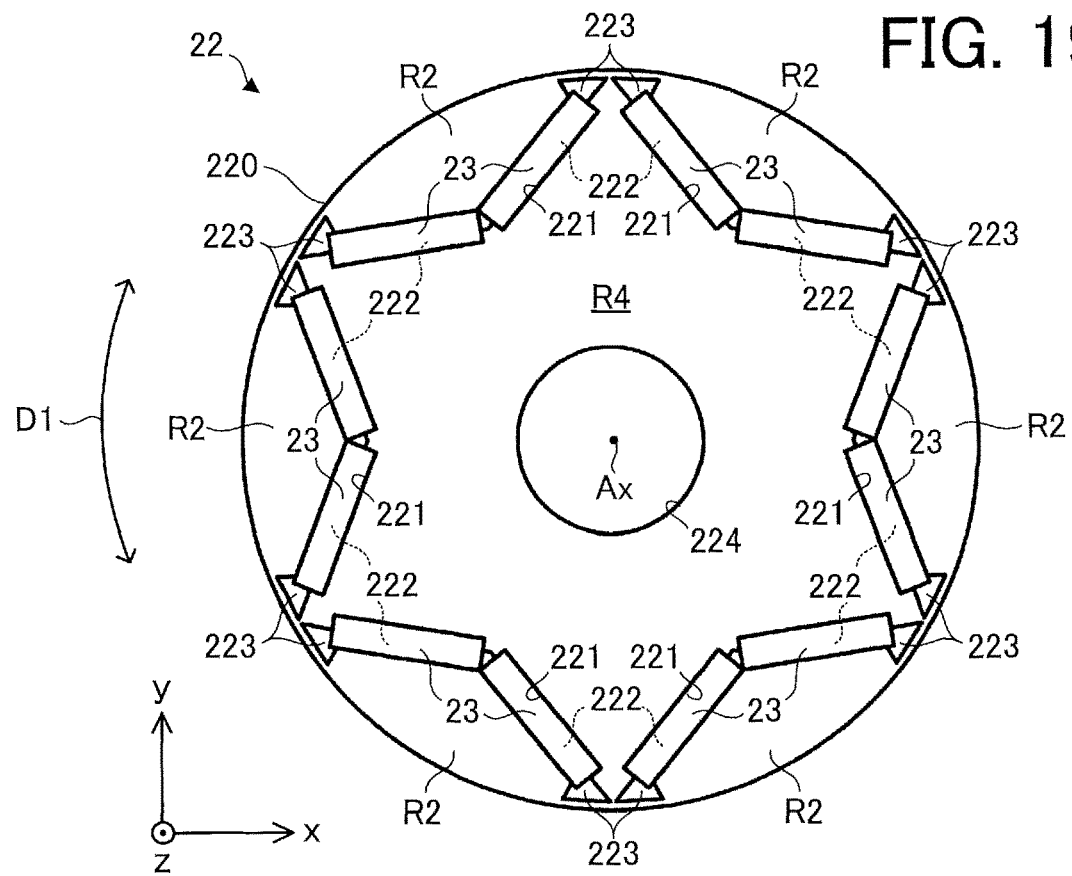
FIG. 19 is a plan view schematically illustrating a structure of a second rotor core according to the fourth variation.

FIG. 19 is a plan view schematically illustrating a structure of the second rotor core 22 in the fourth variation.

In the first rotor core 21 in the fourth variation, a gap 219 exists between the inner wall of the first magnet insertion part 212 and the permanent magnet 23, and the first rotor core 21 has no holes 215. Except for these points, the first rotor core 21 in the first variation is the same as the first rotor core 21 described in the first embodiment.

The first rotor core 21 may include an electromagnetic steel sheet 210 in which no gap 219 exists between the inner wall of the first magnet insertion part 212 and the permanent magnet 23 as long as the first rotor core 21 includes at least one electromagnetic steel sheet 210 in which the gap 219 exists between the inner wall of the first magnet insertion part 212 and the permanent magnet 23.

In the example illustrated in FIG. 18, in the xy plane, the gap 219 is formed at the inner side of the permanent magnet 23 in the radial direction. It should be noted that the gap 219 may be formed at the outer side of the permanent magnet 23 in the radial direction. The width of the gap 219 between the inner wall of the first magnet insertion part 212 and the permanent magnet 23 is, for example, 0.2 mm in the lateral direction of the permanent magnet 23.

As illustrated in FIG. 18, in the rotor core 20 in the fourth variation, the gap 219 exists between the inner wall of the first magnet insertion part 212 and the permanent magnet 23 in the first rotor core 21, and as illustrated in FIG. 19, no gap exists between the inner wall of the second magnet insertion part 222 and the permanent magnet 23 in the second rotor core 22. Thus, in a manner similar to the first embodiment, the volume of all the first rotor cores 21 in the rotor 2 is smaller than the volume of all the second rotor cores 22 in the rotor 2. In addition, the gap 219 between the inner wall of the first magnet insertion part 212 and the permanent magnet 23 functions as magnetic resistance in the first rotor core 21. Accordingly, the amount of magnetic flux flowing from the first rotor core 21 into the first stator core 31 decreases.

Thus, as described in the first embodiment, capacitance of the stator core 30 can be reduced, and magnetic saturation in the first stator core 31 can be reduced. As a result, an iron loss can be reduced. As a result, reliability and efficiency of the electric motor 1 can be enhanced.

Fifth Variation

Figure 20:
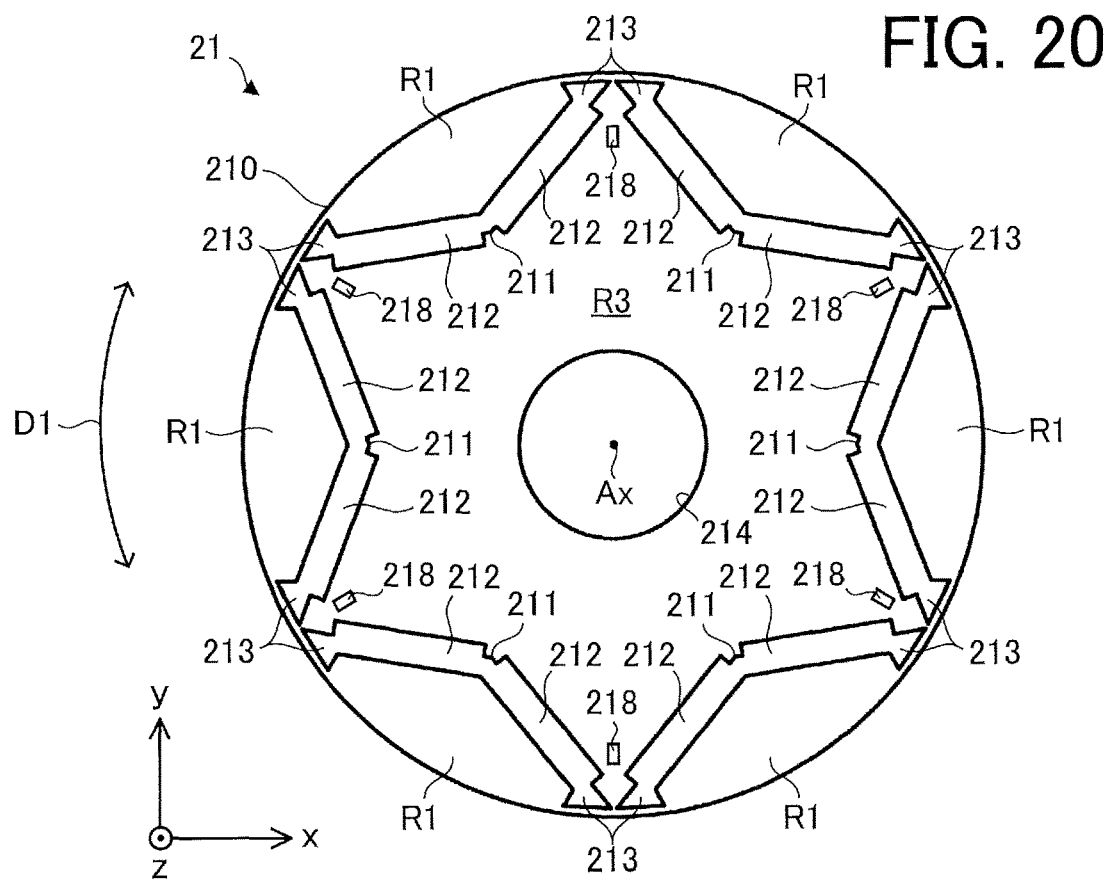
FIG. 20 is a plan view schematically illustrating a structure of a first rotor core according to a fifth variation.

FIG. 20 is a plan view schematically illustrating a structure of the first rotor core 21 in a fifth variation.

Figure 21:
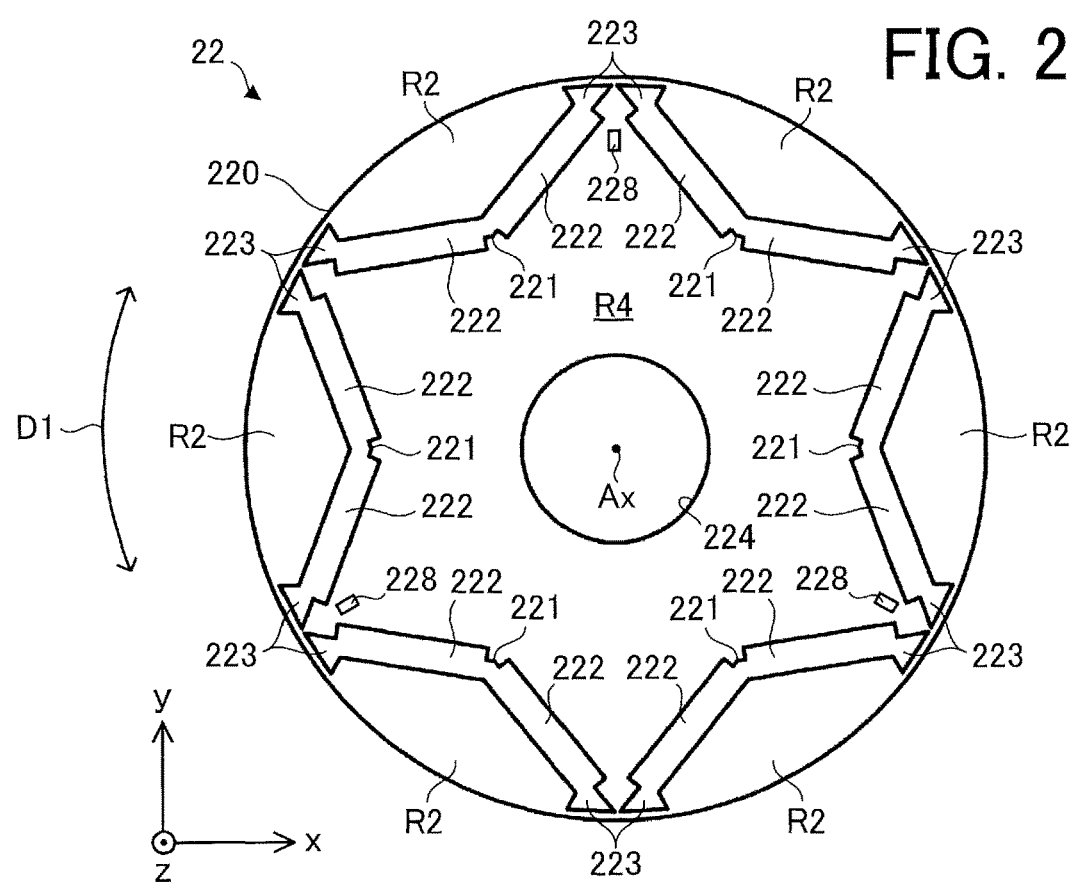
FIG. 21 is a plan view schematically illustrating a structure of a second rotor core according to the fifth variation.

FIG. 21 is a plan view schematically illustrating a structure of the second rotor core 22 in the fifth variation.

The first rotor core 21 in the fifth variation includes a plurality of first caulked parts 218 and has no holes 215. Except for these points, the first rotor core 21 in the fifth variation is the same as the first rotor core 21 described in the first embodiment. In addition, the second rotor core 22 in the fifth variation includes a plurality of second caulked parts 228. In the other points, the second rotor core 22 in the fifth variation is the same as the second rotor core 22 described in the first embodiment.

Each of the first caulked parts 218 is a part formed by swaging, and each of the second caulked parts 228 is also a part formed by swaging. That is, the plurality of electromagnetic steel sheets 210 are fixed together by the first caulked parts 218, and the plurality of electromagnetic steel sheets 220 are also fixed together by the second caulked parts 228.

Each of the first caulked parts 218 is formed at an inter-pole part in the third region R3. Each of the second caulked parts 228 is formed at an inter-pole part in the fourth region R4. In the example illustrated in FIG. 20, the first caulked parts 218 are formed at six inter-pole parts, and in the example illustrated in FIG. 21, the second caulked parts 228 are formed at three inter-pole parts. That is, six first caulked parts 218 are formed in each electromagnetic steel sheet 210, and each electromagnetic steel sheet 220 includes three second caulked parts 228 arranged at regular intervals in the circumferential direction.

In the rotor core 20, the number of the plurality of first caulked parts 218 is larger than the number of the plurality of second caulked parts 228. In addition, in the xy plane, the area of each first caulked part 218 is larger than the area of each second caulked part 228. In other words, the length of the outer periphery (i.e., the peripheral length) of each first caulked part 218 is larger than the length of the outer periphery (i.e., the peripheral length) of each second caulked part 228.

Thus, in the rotor core 20, the sum of the areas of the first caulked parts 218 is larger than the sum of the areas of the second caulked parts 228.

Stress is exerted on each first caulked part 218 and each second caulked part 228. Thus, each first caulked part 218 and each second caulked part 228 have magnetic properties similar to those of gaps. Specifically, the first caulked parts 218 and the second caulked parts 228 function as magnetic resistance in magnetic circuits in the first rotor core 21 and the second rotor core 22. Accordingly, the amount of magnetic flux flowing from the first rotor core 21 into the first stator core 31 decreases, magnetic saturation in the first stator core 31 can be reduced, and an iron loss can be reduced.

In the rotor core 20, since the sum of the areas of the first caulked parts 218 is larger than the sum of the areas of the second caulked parts 228, the amount of magnetic flux flowing from the first rotor core 21 into the first stator core 31 is smaller than the amount of magnetic flux flowing from the second rotor core 22 into the second stator core 32. Thus, as compared to the second stator core 32, magnetic saturation in the first stator core 31 is reduced, and an iron loss is reduced.

Thus, as described in the first embodiment, capacitance of the stator core 30 can be reduced, magnetic saturation in the first stator core 31 can be reduced, and an iron loss can be reduced. As a result, reliability and efficiency of the electric motor 1 can be enhanced.

Six Variation

Figure 22:
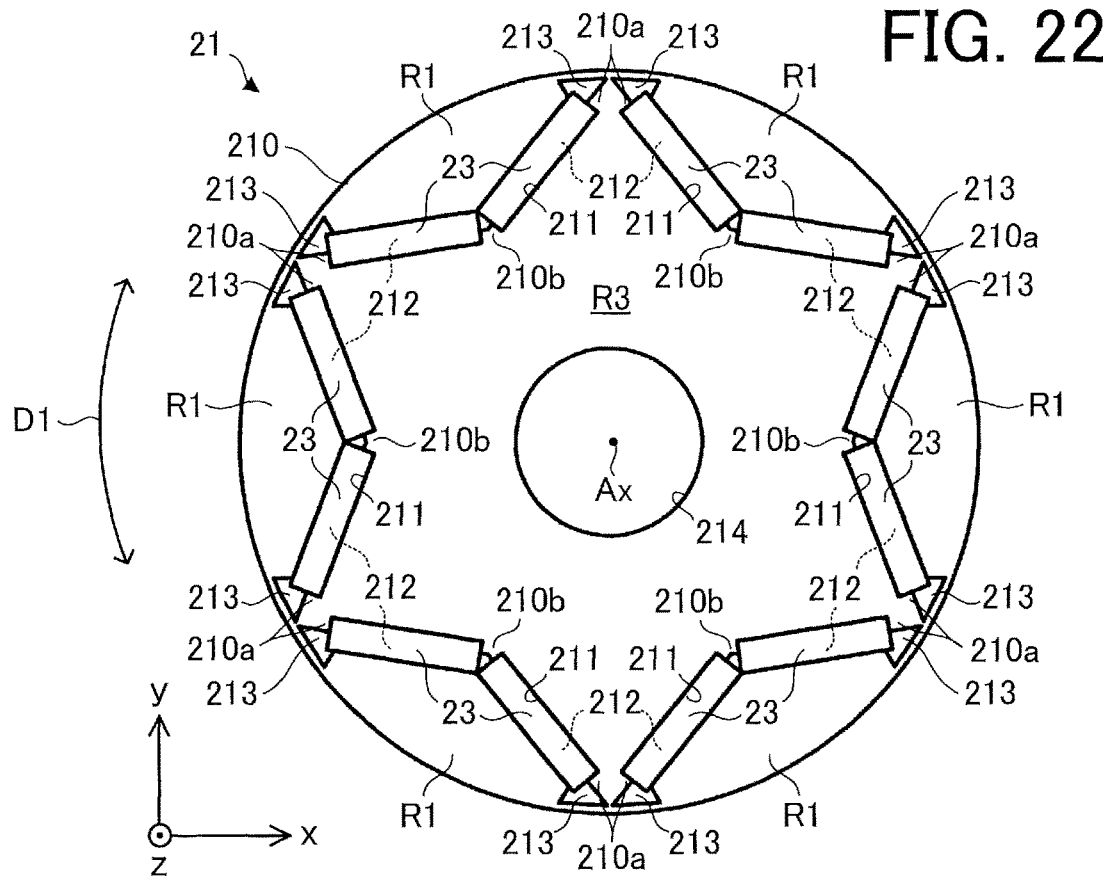
FIG. 22 is a plan view schematically illustrating a structure of a first rotor core according to a sixth variation.

FIG. 22 is a plan view schematically illustrating a structure of the first rotor core 21 in a sixth variation.

Figure 23:
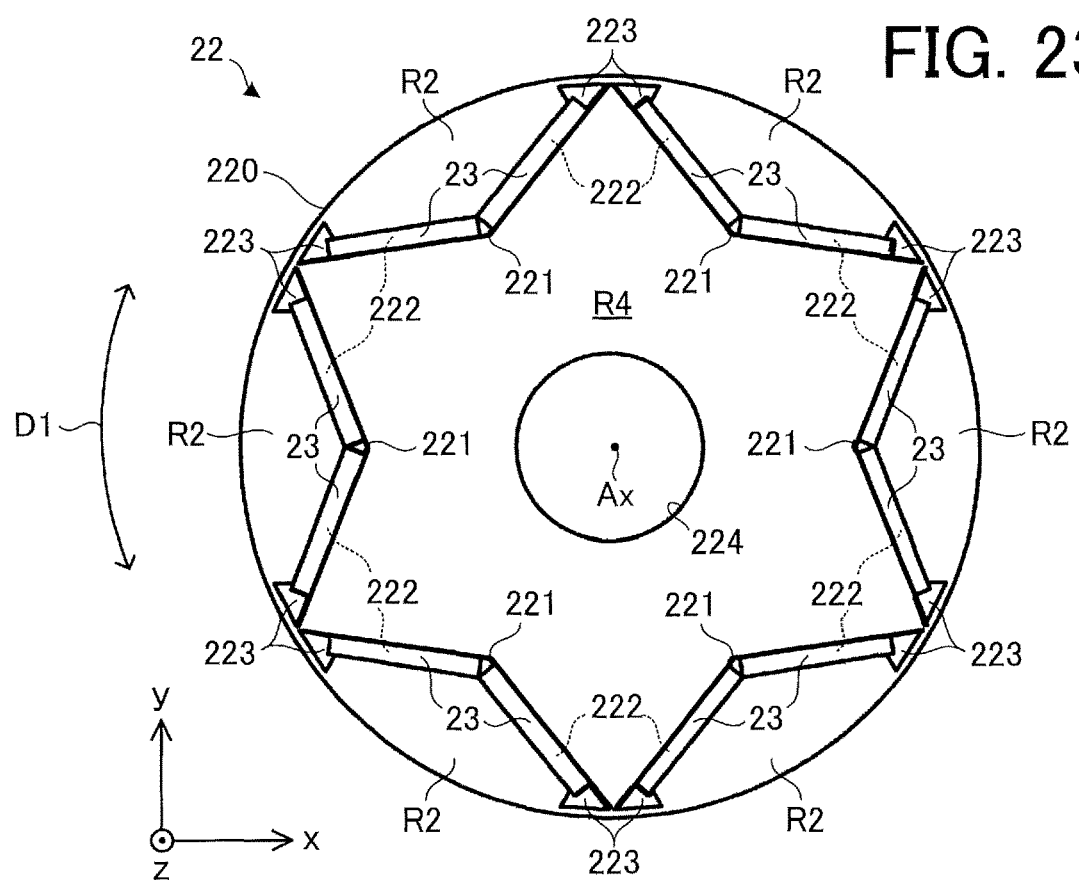
FIG. 23 is a plan view schematically illustrating a structure of a second rotor core according to the sixth variation.

FIG. 23 is a plan view schematically illustrating a structure of the second rotor core 22 in the sixth variation.

In the six variation, in the xy plane, the first rotor core 21 includes at least one projection 210a and at least one projection 210b facing the permanent magnet 23 in the longitudinal direction of the permanent magnet 23. The second rotor core 22 does not include projections corresponding to the projections 210a and 210b. In the xy plane, the area of each first flux barrier part 213 of the first rotor core 21 is smaller than the area of each second flux barrier part 223 of the second stator core 32. Thus, in the rotor core 20, the sum of the areas of the first flux barrier parts 213 of the first rotor core 21 is smaller than the sum of the areas of the second flux barrier parts 223 of the second stator core 32. Thus, the volume of all the first rotor cores 21 in the rotor 2 is larger than the volume of all the second rotor cores 22 in the rotor 2.

Each projection 210a is formed to face the first flux barrier part 213. In other words, each projection 210a projects from the third region R3 in the lateral direction of the permanent magnet 23. Each projection 210b is formed between two permanent magnets 23 inserted in the first hole 211. In other words, each projection 210b projects from the inside to the outside in the radial direction. The shape of the outer periphery of each projection 210a and the shape of the outer periphery of each projection 210b are, for example, arcs or polygons.

The length of each projection 210a in the lateral direction is, for example, 0.7 mm. Each projection 210a does not need to touch the permanent magnet 23. In this case, the minimum distance between each projection 210a and the permanent magnet 23 is, for example, 0.1 mm to 0.35 mm.

As described above, the projections 210a are formed at both sides of one pair of permanent magnets 23 disposed in one first hole 211. In other words, each projection 210a is formed at a position facing an inter-pole part. Accordingly, a magnetic circuit is easily short-circuited in the first rotor core 21, and thus leakage magnetic flux from the permanent magnet 23 increases in the first rotor core 21. As a result, the amount of magnetic flux flowing from the first rotor core 21 into the first stator core 31 decreases, magnetic saturation in the first stator core 31 can be reduced, and an iron loss can be reduced. That is, in a manner similar to the advantages described in the first embodiment, reliability and efficiency of the electric motor 1 can be enhanced.

Second Embodiment

A compressor 6 according to a second embodiment of the present invention will be described.

Figure 24:
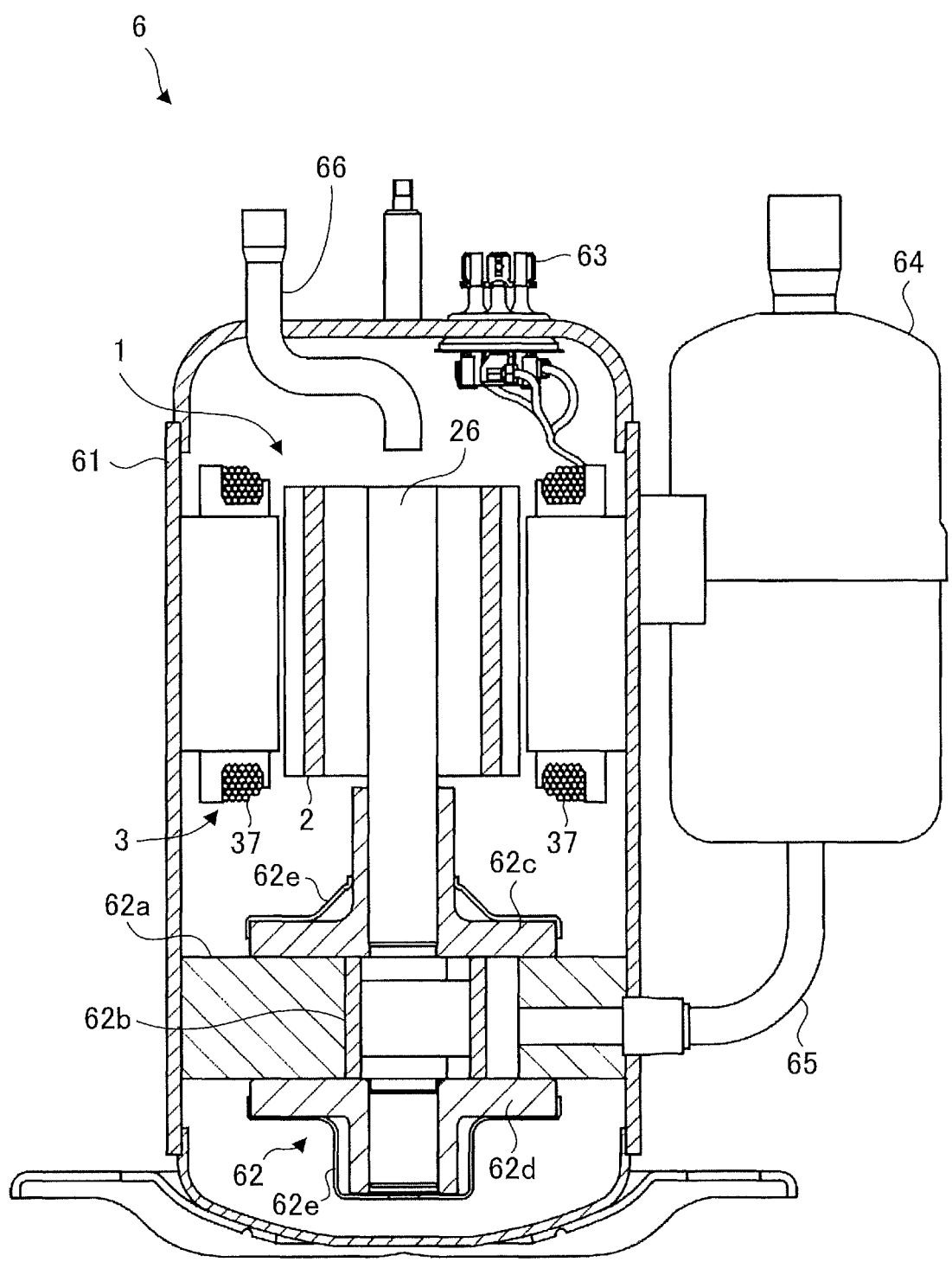
FIG. 24 is a cross-sectional view schematically illustrating a structure of a compressor according to a second embodiment of the present invention.

FIG. 24 is a cross-sectional view schematically illustrating a structure of the compressor 6 according to the second embodiment.

The compressor 6 includes an electric motor 1 serving as an electric element, a closed container 61 serving as a housing, and a compression mechanism 62 serving as a compression element. In this embodiment, the compressor 6 is a rotary compressor. The compressor 6, however, is not limited to the rotary compressor.

The electric motor 1 is the electric motor 1 described in the first embodiment (including the variations thereof). The electric motor 1 drives the compression mechanism 62.

A closed container 61 covers the electric motor 1 and the compression mechanism 62. Refrigerating machine oil for lubricating a sliding part of the compression mechanism 62 is stored in a bottom portion of the closed container 61.

The compressor 6 further includes a glass terminal 63 fixed to the closed container 61, an accumulator 64, a suction pipe 65, and a discharge pipe 66.

The compression mechanism 62 includes a cylinder 62a, a piston 62b, an upper frame 62c (first frame), a lower frame 62d (second frame), and a plurality of mufflers 62e individually attached to the upper frame 62c and the lower frame 62d. The compression mechanism 62 further includes a vane for separating the inside of the cylinder 62a into a suction side and a compression side. The compression mechanism 62 is disposed inside the closed container 61. The compression mechanism 62 is driven by the electric motor 1.

A stator 3 of the electric motor 1 is fixed inside the closed container 61 by either press fitting or shrink fitting. The stator 3 may be attached directly to the closed container 61 by welding instead of press fitting or shrink fitting.

A coil (i.e., stator winding 37) of the electric motor 1 is supplied with electric power through the glass terminal 63.

A rotor (specifically, a shaft 26 of a rotor 2) of the electric motor 1 is rotatably held by the upper frame 62c and the lower frame 62d via bearing parts individually provided in the upper frame 62c and the lower frame 62d.

The shaft 26 is inserted in the piston 62b. The shaft 26 is rotatably inserted in the upper frame 62c and the lower frame 62d. The upper frame 62c and the lower frame 62d close end surfaces of the cylinder 62a. The accumulator 64 supplies a refrigerant (e.g., refrigerant gas) to the cylinder 62a through the suction pipe 65.

Next, an operation of the compressor 6 will be described. The refrigerant supplied from the accumulator 64 is sucked into the cylinder 62a from the suction pipe 65 fixed to the closed container 61. When the electric motor 1 is driven, the piston 62b fitted in the shaft 26 is thereby caused to rotate in the cylinder 62a. In this manner, the refrigerant is compressed in the cylinder 62a.

The refrigerant passes through the mufflers 62e and elevates in the closed container 61. The compressed refrigerant contains refrigerating machine oil. While the mixture of the refrigerant and the refrigerating machine oil passes through a hole formed in the rotor core of the electric motor 1, separation of the refrigerant and the refrigerating machine oil is promoted. Accordingly, it is possible to prevent the refrigerating machine oil from flowing in the discharge pipe 66. In this manner, the compressed refrigerant is supplied toward a high-pressure side of a refrigeration cycle through the discharge pipe 66.

The refrigerant for the compressor 6 may be R410A, R407C, R22, or the like. The refrigerant for the compressor 6 is not limited to these examples. For example, as the refrigerant for the compressor 6, a refrigerant having a low global warming potential (GWP), for example, may be used.

As typical examples of the low-GWP refrigerant, the following refrigerants are available.

(1) Halogenated hydrocarbon having a carbon double bond in its composition is, for example, HFO-1234yf (CF3CF=CH2). HFO is an abbreviation of hydro-fluoro-olefin. Olefin refers to unsaturated hydrocarbon having one double bond. The GWP of HFO-1234yf is 4.

(2) Hydrocarbon having a carbon double bond in its composition is, for example, R1270 (propylene). The GWP of R1270 is 3, which is smaller than the GWP of HFO-1234yf, but flammability of R1270 is higher than flammability of HFO-1234yf.

(3) A mixture including at least one of halogenated hydrocarbon having a carbon double bond in its composition or hydrocarbon having a carbon double bond in its composition is, for example, a mixture of HFO-1234yf and R32. Since HFO-1234yf is a low-pressure refrigerant, a pressure loss is large, and performance of the refrigeration cycle tends to decrease especially in an evaporator. Thus, it is preferable to use a mixture with, for example, R32 or R41 as a high-pressure refrigerant.

The compressor 6 according to the second embodiment has advantages described in the first embodiment.

In addition, since the compressor 6 according to the second embodiment includes the electric motor 1, the compressor 6 has high compression efficiency.

Third Embodiment

A refrigeration air conditioning apparatus 7 including the compressor 6 according to the second embodiment will be described.

Figure 25:
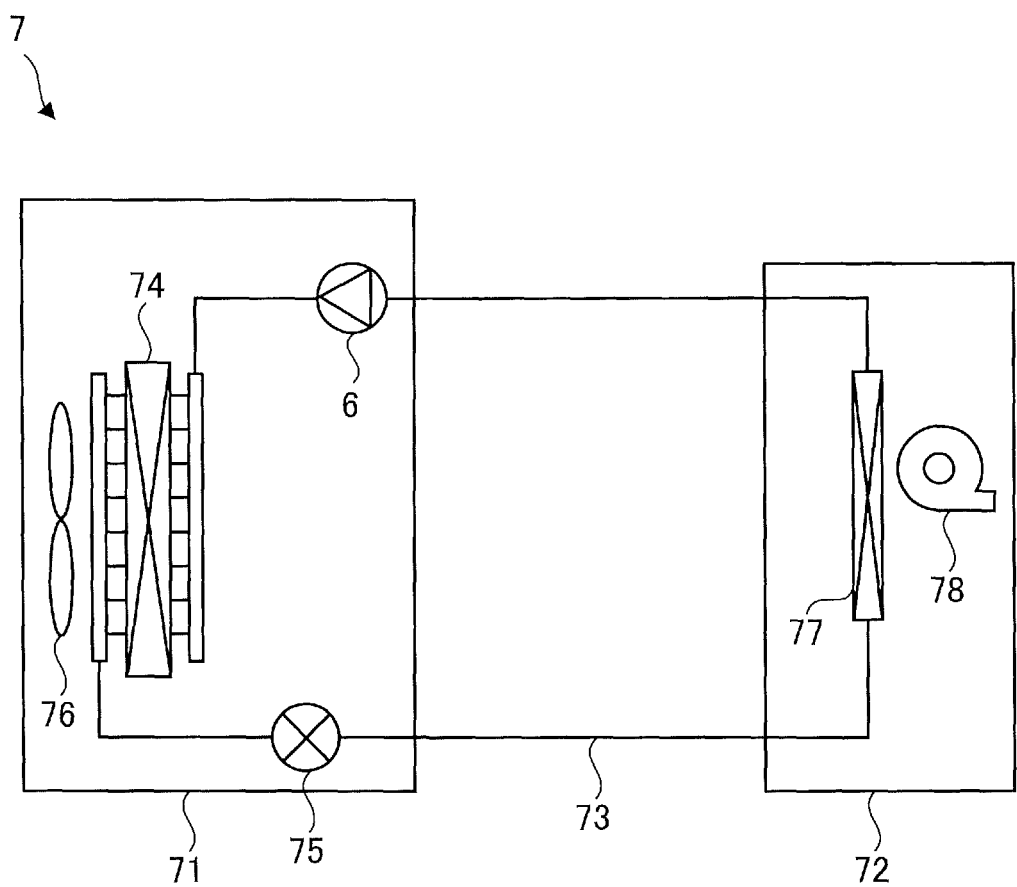
FIG. 25 is a diagram schematically illustrating a configuration of a refrigeration air conditioning apparatus according to a third embodiment of the present invention.

FIG. 25 is a diagram schematically illustrating a configuration of the refrigeration air conditioning apparatus 7 according to a third embodiment of the present invention.

The refrigeration air conditioning apparatus 7 is, for example, an air conditioner capable of performing cooling and heating operations. A refrigerant circuit diagram illustrated in FIG. 25 is an example of a refrigerant circuit diagram of the air conditioner capable of performing a cooling operation.

The refrigeration air conditioning apparatus 7 according to the third embodiment includes an outdoor unit 71, an indoor unit 72, and a refrigerant pipe 73 connecting the outdoor unit 71 and the indoor unit 72 to thereby constitute a refrigerant circuit (freezing circuit).

The outdoor unit 71 includes a compressor 6, a condenser 74, a throttling device 75, and an outdoor air blower 76 (first air blower). The condenser 74 condenses a refrigerant compressed by the compressor 6. The throttling device 75 decompresses the refrigerant condensed by the condenser 74 to thereby adjust a flow rate of the refrigerant. The throttling device 75 will be also referred to as a decompression device.

The indoor unit 72 includes an evaporator 77 and an indoor air blower 78 (second air blower). The evaporator 77 evaporates the refrigerant decompressed by the throttling device 75 to thereby cool indoor air.

A basic operation of a cooling operation in the refrigeration air conditioning apparatus 7 will now be described. In the cooling operation, a refrigerant is compressed by the compressor 6 and the compressed refrigerant flows into the condenser 74. The condenser 74 condenses the refrigerant, and the condensed refrigerant flows into the throttling device 75. The throttling device 75 decompresses the refrigerant, and the decompressed refrigerant flows into the evaporator 77. In the evaporator 77, the refrigerant evaporates to be a refrigerant gas, and the refrigerant gas flows into the compressor 6 of the outdoor unit 71 again. The outdoor air blower 76 sends outdoor air to the condenser 74, the indoor air blower 78 sends indoor air to the evaporator 77, and consequently heat exchange is performed between the refrigerant and air.

The configuration and operation of the refrigeration air conditioning apparatus 7 described above are examples, and the present invention is not limited to the examples described above.

The refrigeration air conditioning apparatus 7 according to the third embodiment has the advantages described in the first and second embodiments.

In addition, since the refrigeration air conditioning apparatus 7 according to the third embodiment includes the compressor 6 having high compression efficiency, the refrigeration air conditioning apparatus 7 has high efficiency.

As described above, preferred embodiments have been specifically described. However, it is obvious that those skilled in the art would take various modified variations based on the basic technical idea and teaching of the present invention.

Features of the embodiments and variations described above may be combined as appropriate.

What is claimed is:

1. An electric motor comprising:
   a stator including a first stator core, a second stator core, and a slot in which a stator winding is disposed, the first stator core and the second stator core being laminated in an axial direction; and
   a rotor including a first rotor core facing the first stator core in a radial direction, a second rotor core facing the second stator core in the radial direction, and a permanent magnet, the rotor being disposed inside the stator, wherein
   the stator includes a depression formed in a side wall of the first stator core in a position facing the slot, the depression not touching the stator winding,
   the first rotor core includes at least one first hole having a first magnet insertion part in which the permanent magnet is inserted and a first flux barrier part communicating with the first magnet insertion part,
   the second rotor core includes at least one second hole having a second magnet insertion part in which the permanent magnet is inserted and a second flux barrier part communicating with the second magnet insertion part, and
   a volume of the first rotor core is smaller than a volume of the second rotor core.

2. The electric motor according to claim 1, wherein
   the first rotor core includes a first region and a hole formed in the first region, the first region being a region located outside the at least one first hole in the radial direction,
   the second rotor core includes a second region that is a region located outside the at least one second hole in the radial direction, and
   a volume of the first region is smaller than a volume of the second region.

3. The electric motor according to claim 1, wherein
   the first rotor core includes a first region and a recess formed in an outer peripheral surface of the first region, the first region being a region located outside the at least one first hole in the radial direction,
   the second rotor core includes a second region that is a region located outside the at least one second hole in the radial direction, and
   a volume of the first region is smaller than a volume of the second region.

4. The electric motor according to claim 1, wherein
   the first rotor core has a first radius and a second radius in a plane orthogonal to the axial direction, the second radius being smaller than the first radius, and
   the second rotor core is a complete circle having a radius equal to the first radius in the plane.

5. The electric motor according to claim 1, wherein
   the at least one first hole comprises six first holes arranged in a circumferential direction,
   the at least one second hole comprises six second holes arranged in a circumferential direction,
   the first rotor core includes a first shaft insertion hole in which a shaft is inserted, a third region that is a region surrounded by the six first holes, and a plurality of holes arranged in a circumferential direction in the third region,
   the second rotor core includes a second shaft insertion hole in which the shaft is inserted and a fourth region that is a region surrounded by the six second holes, and
   a volume of the third region is smaller than a volume of the fourth region.

6. The electric motor according to claim 1, wherein a gap exists between an inner wall of the first magnet insertion part and the permanent magnet, and no gap exists between an inner wall of the second magnet insertion part and the permanent magnet.

7. The electric motor according to claim 1, wherein
   the first rotor core includes a plurality of first caulked parts,
   the second rotor core includes a plurality of second caulked parts, and
   the number of the plurality of first caulked parts is larger than the number of the plurality of second caulked parts.

8. The electric motor according to claim 1, wherein
   the first rotor core includes a first caulked part,
   the second rotor core includes a second caulked part, and
   in a plane orthogonal to the axial direction, an area of the first caulked part is larger than an area of the second caulked part.

9. The electric motor according to claim 1, wherein maximum magnetic flux density of magnetic flux from a magnetic pole center part of the first rotor core in a radial direction is smaller than maximum magnetic flux density of magnetic flux from a magnetic pole center part of the second rotor core in the radial direction.

10. A compressor comprising:
    a closed container;
    a compression mechanism disposed inside the closed container; and
    the electric motor to drive the compression mechanism, according to claim 1.

11. An air conditioner comprising the compressor according to claim 10, a condenser, a throttling device, and an evaporator.

12. An electric motor comprising:
    a stator including a first stator core, a second stator core, and a slot in which a stator winding is disposed, the first stator core and the second stator core being laminated in an axial direction; and
    a rotor including a first rotor core facing the first stator core in a radial direction, a second rotor core facing the second stator core in the radial direction, and a permanent magnet, the rotor being disposed inside the stator, wherein
    the stator includes a depression formed in a side wall of the first stator core in a position facing the slot, the depression not touching the stator winding,
    the first rotor core includes at least one first hole having a first magnet insertion part in which the permanent magnet is inserted and a first flux barrier part communicating with the first magnet insertion part, the second rotor core includes at least one second hole having a second magnet insertion part in which the permanent magnet is inserted and a second flux barrier part communicating with the second magnet insertion part, in a plane orthogonal to the axial direction, the first rotor core includes a projection facing the permanent magnet in a longitudinal direction of the permanent magnet, in the plane, an area of the first flux barrier part is smaller than an area of the second flux barrier part, and a volume of the first rotor core is larger than a volume of the second rotor core.

13. An electric motor comprising:

a stator including a first stator core, a second stator core, and a slot in which a stator winding is disposed, the first stator core and the second stator core being laminated in an axial direction; and a rotor including a first rotor core facing the first stator core in a radial direction, a second rotor core facing the second stator core in the radial direction, and a permanent magnet, the rotor being disposed inside the stator, wherein the stator includes a depression formed in a side wall of the first stator core in a position facing the slot, the depression not touching the stator winding, the first rotor core includes at least one first hole having a first magnet insertion part in which the permanent magnet is inserted, the second rotor core includes at least one second hole having a second magnet insertion part in which the permanent magnet is inserted, and a volume of the first rotor core is smaller than a volume of the second rotor core.

14. A compressor comprising:

a closed container;

a compression mechanism disposed inside the closed container; and the electric motor to drive the compression mechanism, according to claim 13.

15. An air conditioner comprising the compressor according to claim 14, a condenser, a throttling device, and an evaporator.

* * * * *